(12) United States Patent
Ciolfi et al.

(10) Patent No.: US 12,536,348 B1
(45) Date of Patent: Jan. 27, 2026

(54) SYSTEMS AND METHODS FOR ANALYZING VARIANT CONFIGURATIONS OF SIMULATION MODELS

(71) Applicant: The MathWorks, Inc., Natick, MA (US)

(72) Inventors: John E. Ciolfi, Wellesley, MA (US); Vaibhav Awale, Sangli (IN); Sudha S. Dhoorjaty, Bangalore (IN)

(73) Assignee: The Math Works, Inc., Natick, MA (US)

( * ) Notice: Subject to any disclaimer, the term of this patent is extended or adjusted under 35 U.S.C. 154(b) by 499 days.

(21) Appl. No.: 16/835,429

(22) Filed: Mar. 31, 2020

Related U.S. Application Data

(60) Provisional application No. 62/946,090, filed on Dec. 10, 2019.

(51) Int. Cl.
 *G06F 30/20* (2020.01)
 *G06F 8/34* (2018.01)
 *G06F 16/901* (2019.01)
 *G06F 16/9038* (2019.01)
 (Continued)

(52) U.S. Cl.
 CPC ............... *G06F 30/20* (2020.01); *G06F 8/34* (2013.01); *G06F 16/9024* (2019.01); *G06F 16/9038* (2019.01); *G06F 30/10* (2020.01); *G06N 7/00* (2013.01)

(58) Field of Classification Search
 CPC ........ G06F 30/20; G06F 8/34; G06F 16/9024; G06F 16/9038; G06F 30/10; G06N 7/00
 See application file for complete search history.

(56) References Cited

U.S. PATENT DOCUMENTS 5,475,851 A * 12/1995 Kodosky ................. G06T 19/00
 358/1.18
7,742,903 B2 6/2010 Ciolfi et al.
 (Continued)

OTHER PUBLICATIONS

Shakeri, M. (2018). Variant configuration and management: challenges and opportunities (Doctoral dissertation, Massachusetts Institute of Technology). (Year: 2018).*

(Continued)

*Primary Examiner* — Ryan F Pitaro
*Assistant Examiner* — Pursottam Giri
(74) *Attorney, Agent, or Firm* — Cesari and McKenna, LLP

(57) ABSTRACT

Systems and methods may analyze a simulation model that includes model elements configured to operate as variants. The variants may be controlled by variant conditions that may include variant control variables. A group of variant configurations may be defined for the model where each variant configuration may include a different set of the variant control variables. For each variant configuration, the systems and methods may determine which model elements configured to operate as variants are active and which model elements are inactive. The systems and methods may also determine which model elements, if any, are always active, are never active, or are sometimes active. A visualization tool may present the results of the variant configuration analysis in the form of a heatmap, a textual report, an annotated version of the simulation model, or graph, among other forms.

26 Claims, 30 Drawing Sheets

(51) Int. Cl.
  *G06F 30/10* (2020.01)
  *G06N 7/00* (2023.01)

(56) References Cited

U.S. PATENT DOCUMENTS

| | | | | |
|---|---|---|---|---|
| 8,386,222 | B2* | 2/2013 | Ciolfi | G06F 30/20 |
| | | | | 703/6 |
| 8,549,470 | B2 | 10/2013 | Ciolfi et al. | |
| 8,700,368 | B1* | 4/2014 | Ciolfi | G06F 30/20 |
| | | | | 703/6 |
| 8,924,193 | B2 | 12/2014 | Hosey et al. | |
| 8,983,823 | B1* | 3/2015 | Koh | G06F 11/3608 |
| | | | | 703/22 |
| 9,361,119 | B1* | 6/2016 | Lin | G06F 9/44505 |
| 9,378,562 | B1* | 6/2016 | Ciolfi | G06T 17/00 |
| 10,521,197 | B1 | 12/2019 | Ciolfi et al. | |
| 10,545,731 | B1 | 1/2020 | Ciolfi et al. | |
| 2005/0278162 | A1* | 12/2005 | Ciolfi | G06F 30/20 |
| | | | | 703/22 |
| 2009/0235227 | A1* | 9/2009 | Hartman | G06F 30/00 |
| | | | | 717/104 |
| 2011/0145271 | A1* | 6/2011 | Noyes | G06F 16/90344 |
| | | | | 707/769 |
| 2014/0358507 | A1* | 12/2014 | Aldrich | G06F 11/3608 |
| | | | | 703/6 |

OTHER PUBLICATIONS

Schulze, Michael, et al., "Automotive Model-Driven Development and the Challenge of Variability," ACM, Inc., ACM, SPLC'12: Proceedings of the 16th International Software Product Line Conference, Salvador, Brazil, Rightslink, vol. 1, Sep. 2-7, 2012, pp. 207-214.

Assunção, Wesley Klewerton Guez, "ModelVars2SPL: An Automated Approach to Reengineer Model Variants into Software Product Lines," Federal University of Paraná, Curitiba-PR, Brazil, Apr. 2017, pp. 1-185.

Sampath, Prahladavaradan, "An Elementary Theory of Product-Line Variations," BCS, Formal Aspects of Computing, Apr. 16, 2013, pp. 695-727.

"Simulink®: User's Guide," R2019b, The MathWorks, Inc., Sep. 2019, pp. 1-4620.

U.S. Appl. No. 16/896,723, filed Jun. 9, 2020 by Raju Kottamadal et al. for Systems and Methods for Creating Variant Regions in Acausal Simulation Models, pp. 1-100.

* cited by examiner

Variant Configuation Analysis

VARIANT ANALYSIS

Search Blocks: [Search Block]  ☑ Always Active
View Blocks: [All Blocks ▼]  ☑ Partially Active
FILTER  ☑ Never Active

| Activeness | Model Hierarchy | C1 | C2 | C3 | C4 |
|---|---|---|---|---|---|
| | ▼ basic_variant_model | | | | |
| ⊛ | ▶ Control Logic | ✓ | ✓ | ✓ | ✓ |
| ⊛ | D/A 12-bit | c3✓ | c3✓ | c3✓ | c3✓ |
| ○ | D/A 14-bit | c4 | c4 | c4 | c4 |
| ◐ | ▶ Logic Fault Detection | c5✓ | c5✓ | c5 | c5 |
| ◐ | ▶ Reject Bad Sensor | c6 | c6 | c6✓ | c6✓ |
| ⊛ | Variant Sink D/A | ✓ | ✓ | ✓ | ✓ |
| ◐ | Variant Source 12 or 14-bit | c5✓ | c5✓ | c5 | c5 |
| ◐ | Variant Source 12-bit A/D | c7✓ | c7✓ | c7 | c7 |
| ⊛ | Variant Source Single or Redundant Sensors | ✓ | ✓ | ✓ | ✓ |
| ◐ | Vendor A | c8✓ | c8 | c8 | c8 |
| ◐ | Vendor B | c9 | c9 | c9 | c9 |
| ⊛ | ▶ downscale | c3✓ | c3✓ | c3✓ | c3✓ |
| ◐ | first sensor | c10 | c10 | c10✓ | c10✓ |
| ◐ | ▶ scale | c7✓ | c7✓ | c7 | c7 |
| ◐ | second sensor | c6 | c6 | c6✓ | c6✓ |

ANNOTATION

| Annotation | Condition |
|---|---|
| c7 | AD_BITS==12&&SENSOR==SENSORS SINGLE |
| c8 | AD_BITS==12&&SENSOR==SENSORS SINGLE&&VENDOR==VENDORS A |
| c9 | AD_BITS==12&&SENSOR==SENSORS SINGLE&&VENDOR==VENDORS B |
| c1 | CTRL == 1 |
| c2 | CRTL == 2 |
| c3 | DA_BITE == 12 |

Blocks inactive in all analyzed configurations
- basic_variant_model/D//A 14-bit Blocks active in all analyzed configurations
- basic_variant_model/Control Logic
- basic_variant_model/Control Logic/In1
- basic_variant_model/Control Logic Out1
- basic_variant_model/D//A 12-bit
- basic_variant_model/Variant Sink D//A
- basic_variant_model/Variant Source Single or Redundant Sensors
- basic_variant_model/downscale
- basic_variant_model/downscale/In1
- basic_variant_model/downscale/Out1

— 806

Configuration C1
Active Blocks

Table 2.1. Active Blocks in Configuration C1

| Block Path | Variant Condition |
|---|---|
| basic_variant_model/Control Logic | |
| basic_variant_model/Control Logic/In1 | |
| basic_variant_model/Control Logic/Linear | CTRL == 1 |
| basic_variant_mmodel Control Logic/Linear/Control Logic | |
| basic_variant_model/Control Logic/Linear/In1 | |
| basic_variant_model/Control Logic/Linear/Out1 | |
| basic_variant_model/Control Logic/Out1 | |
| basic_vaiant_model/D//A 12-bit | DA_BITS == 12 |

Inactive Blocks

Table 2.2. Inactive Blocks in Configuration C1

| Block Path | Variant Condition |
|---|---|
| basic_variant_model/Control Logic/Non Linear | CTRL == 2 |
| basic_variant_model Control/Logic Non Linear/Control Logic | |
| basic_variant_model/Control Logic/Non Linear/In1 | |

FIG. 8B

SYSTEMS AND METHODS FOR ANALYZING VARIANT CONFIGURATIONS OF SIMULATION MODELS

CROSS-REFERENCE TO RELATED APPLICATIONS

The present application claims the benefit of U.S. Provisional Patent Application Ser. No. 62/946,090 filed Dec. 10, 2019, by John Ciolfi et al. for Systems and Method for Analyzing Variant Configurations of Simulation Models, which application is hereby incorporated by reference in its entirety.

BRIEF DESCRIPTION OF THE DRAWINGS

The description below refers to the accompanying drawings, of which:

FIG. 2 is an illustration of an example User Interface (UI) presenting results of a variant configuration analysis in the form of a heat map in accordance with one or more embodiments;

FIGS. 8A and 8B are partial views of an illustration of an example User Interface (UI) presenting results of a variant configuration analysis in the form of a report in accordance with one or more embodiments;

DETAILED DESCRIPTION OF ILLUSTRATIVE EMBODIMENTS

Figure 1A:
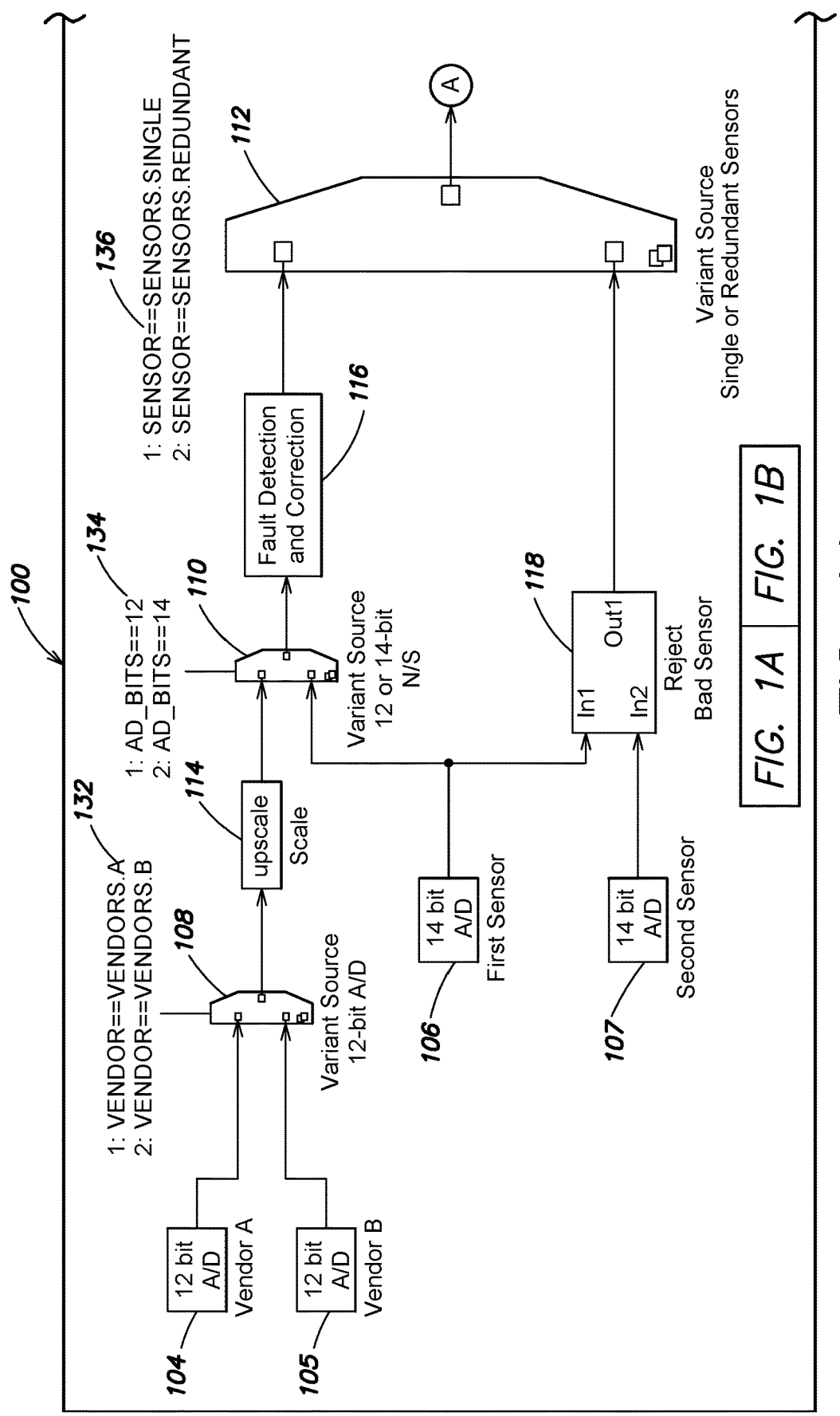
FIGS. 1A and 1B are partial views of an illustration of an example executable simulation model in accordance with one or more embodiments.

Computer-based simulation environments may be used to create simulation models of systems, such as control systems, communications systems, factory automation systems, etc. A user may construct a model within the simulation environment that, when executed, simulates operation of the system. Simulation environments may support the creation of models graphically and/or textually. A graphical model may include a plurality of model elements, such as blocks that perform predetermined and/or custom defined functionality during execution of the model, parameters, states, state transitions, events, and connections, such as signals.

A group of blocks may be contained within another block thereby establishing hierarchy or layers in the model. The group of blocks may be visually presented within the model as a single block although it may be opened to present the blocks contained in the single block. When a single block "contains" other blocks, it is referred to as a hierarchical block. Exemplary hierarchical blocks include subsystem and submodel blocks of the Simulink model-based design environment, Virtual Instruments (VIs) of the LabVIEW programming system, and SuperBlocks of the MatrixX modeling environment, among others. A hierarchical block may itself contain one or more other hierarchical blocks, establishing multiple hierarchal levels through a model.

The blocks of a simulation model may be linked together by connections to exchange information, such as data, control, signals, state transitions, events, messages, and/or physical relationships, such as mechanical, electrical, hydraulic, etc., among the blocks. The connections may establish information paths through the model, which may extend from the model's top-level inputs to its top-level outputs. Connections may have a graphical representation, such as lines, wires, arrows, etc., that indicates the type of connection. For example, in a time-based simulation environment, a connection appearing as a single line arrow may represent a mathematical relationship, such as a signal, between two connected blocks where a first, e.g., source, block updates the signal, and a second, e.g., sink, block reads the signal. A signal may refer to a time varying quantity having one or more values for example at all points in time during model execution. For example, a signal may have a value at each time step during execution of a model.

The arrangement of blocks and connections within a model may specify a physical system, procedure, algorithm, and/or behavior, and the model may be executed, e.g., simulated, by the modeling environment to model system behavior or perform the procedure, algorithm, and/or behavior. During execution, a model may process input values, and may generate output values. A user may direct the modeling environment to execute, e.g., run, a model using sample input data, and may evaluate whether the model, when executed, generates expected output values. If it does not, the user may revise the model. When the user is satisfied that the model correctly simulates the system being modeled, e.g., to some degree of accuracy, a code generator may generate code, such as computer source code, for the model.

The code generator may be part of the modeling environment, it may be a separate, add-on tool, or it may be a separate computer program. The generated code, which may have the same behavior as the model, may be run outside of the modeling environment. For example, the code may be compiled and executed by a microprocessor, a digital signal processor (DSP), or other processing logic of a physical, deployed system. In some embodiments, the generated code may be in the form of a hardware description language (HDL) and may be used to synthesize one or more programmable logic devices (PLDs), such as a Field Programmable Gate Array (FPGA), an Application Specific Integrated Circuit (ASIC), a Complex Programmable Logic Device (CPLD), a System on a Chip (SoC), etc. The deployed system may represent a production device, and may be deployed in a real-world environment, such as a factory floor, a communication device, an automobile, an aircraft or other vehicle, an appliance, etc.

Simulation environments may support the creation of models of different domains, such as dynamic or time-based models, state-based models, event-based models, and data/control flow models, among others. A dynamic system is a system that changes with time. As noted above, examples of a such systems include factory equipment, robotic systems, vehicles, such as cars, trucks, planes, drones and space systems, communication systems, and appliances, such as washing machines. Time-based models can represent dynamic systems. For example, time-based relationships may be defined between signals and state variables of a dynamic model, and the solution of the model may be obtained by evaluating these relationships at intervals called time steps over a time period, e.g., the model's simulation time. The simulation environment may specify a default simulation time, for example from zero to ten seconds, although the simulation time, including the units of time, may be altered by a user. Simulation time differs from actual clock time. For example, even though a model's execution may be simulated from zero to ten seconds, it may take a small fraction of actual clock time to execute the model over that simulation time.

A simulation environment may include a model compiler, which may include or have access to one or more solvers, that may generate a set of equations for the relationships between a model's signals and state variables. During model execution, a solver, which may be the same solver used in the generation of equations or may be another solver, solves these equations. The solver may determine the particular time steps, called sample times, during which equations associated with the model's elements may be executed. An example of a time-based block diagram modeling environment is the Simulink® model-based design environment from The Math Works, Inc. of Natick, MA.

A state-based model, which may also be referred to as a statechart, may be represented graphically as a connected graph having nodes that represent states connected by edges representing transitions. The state-based model may be run within a time-based execution domain. At any given timestep, one or more of the state-based model's states may be active. Actions defined within the model may be triggered in response to the occurrence of events, which may also be defined within the model. Actions also may be predicated on the evaluation of a condition. An example of a state-based modeling environment is the Stateflow® programming system from The Math Works, Inc.

When a system being modeled includes multiple, different configurations, separate models may need to be created, e.g., one for each configuration. For example, if modeling a car, there can be variations in the car, e.g. two door vs. four door, small engine vs. big engine, etc. Each variation may be called a configuration and requires a separate model, though for each configuration the models may have common portions. While each model represents a different configuration, much of the overall structure of the models may be the same. The need to create multiple, separate models may consume significant computer memory resources as each entire model must be saved to memory. In addition, if changes need to be made to the common portion, those same changes must be made to each separate model. Updating each separate model can be error prone. For example, suppose a user is modeling a car which comes in two variations, one with a small engine and one with a big engine. This means the user must create two configurations of a model, one for a small engine and one for a big engine. The two configurations of the model will share much of the same structure. For example, the anti-lock braking subsystem may be the same between the two models. The essential difference between the two models of the car is the two engines. If the user is to maintain two separate models, there would be duplicated model parts that make it difficult to update.

To address these disadvantages, simulation environments, such as the Simulink® simulation environment, support the creation of a single model that can implement multiple, alternative configurations. One portion of the model may represent a common algorithmic structure of the system whose behavior is always present, while other portions of the model may include alternative algorithmic substructures each implementing different configurations of the system being modeled. The alternative algorithmic substructures may have different execution behaviors. For any given execution of the model or generation of code for the model, a set of the alternative algorithmic substructures may be determined to be active, and may be executed together with the model's common algorithmic structure. Other algorithmic substructures are deemed to be inactive, and are not executed. The inactive algorithmic substructures may be ignored by a model execution engine as though they were deleted from the model. With this feature, a single model may be created that nonetheless represents many different alternative configurations.

The alternative algorithmic structures may be called variant choices and may be disposed in a region of the model called a variant region. In some embodiments, each variant choice may be implemented through a different arrangement of blocks, e.g., different blocks and/or different connections among blocks. The variant choices may receive at least some of the same input variables, which may be computed by the model's common algorithmic structure, and may compute at least some of the same output variables, which may be processed by the model's common algorithmic structure.

Each variant choice may be associated with a conditional expression called a variant condition. The variant condition may be a logical expression and may include one or more variables called variant control variables. During model compilation, values for the variant control variables may be determined, and the logical expressions of the variant conditions evaluated. The variant conditions may be defined so that no more than one variant condition for a given variant region evaluates to True at a time. The one variant choice whose associated variant condition evaluates to True may be deemed the active variant choice for that execution of or generation of code for the model. The other variant choices whose variant conditions evaluate to False are deemed inactive. One of the variant choices may be designated the default variant choice, and it may be activated when none of the variant conditions evaluates to True. By changing the values of the variant control variables, a user may control which variant choice is active for a given execution or generation of code. Values for variant control variables may be specified in a workspace associated with the model and/or in a data dictionary, among other memory locations.

In some embodiments, a simulation environment may provide specific types of blocks that support the creation of variant choices. For example, the Simulink® simulation environment includes a Variant Source block type, a Variant Sink block type, a Variant Subsystem block type, and a Variant Submodel block type. Instances of these various block types may be included in a model to establish a variant region of the model in which variant choices are defined. These blocks, which may be called variant boundary blocks, may establish a demarcation between the variant region of a model and the model's common algorithmic structure. That is, the variant boundary blocks may define a boundary that separates the variant region from a model's common algorithmic structure. Inside the boundary are variant choices. Outside the boundary are the blocks and connections that form the model's common algorithmic structure. Variant boundary blocks, unlike other blocks, may provide support for variant conditions to implement alternative choices that influence the dynamics of the model.

The Variant Subsystem block type and the Variant Submodel block type may act as containers for variant choices. Each variant choice contained within a Variant Subsystem block or a Variant Submodel block may be associated with a variant condition. The variant choices may be represented by one or more subsystems, submodels, and/or blocks. The Variant Subsystem or Variant Submodel blocks may include one or more input port blocks, such as Inport blocks, for receiving input information from the model's common algorithm structure, and one or more output port blocks, such as Outport blocks, for providing information computed by the Variant Subsystem or Variant Submodel block to the model's common algorithmic structure. For a given execution of the Variant Subsystem or Variant Submodel block, one variant choice is active. The modeling environment may programmatically connect the active variant choice to the Inport and Outport blocks of the Variant Subsystem or Variant Submodel blocks during model compilation.

Variant Source and Variant Sink blocks may include multiple input ports and/or multiple output ports. Blocks defining different variant choices may be connected between the Variant Source and Variant Sink blocks. The variant choices may thus be enclosed between Variant Source and Variant Sink blocks. The input and/or output ports of the Variant Source and Variant Sink blocks may be associated with variant conditions to determine which input and/or output ports are active for a given execution of the model or for generation of code for the model. A Variant Source block may allow for variation on the source of a signal. A Variant Sink block may allow for variation on the destination of a signal.

Each variant block defines a variant region that consists of a set of choices. When the variant block is in a time-based domain or a data-flow domain, at most one choice can be active. In physical domains such as electrical circuits, there can be more than one choice active. The active choice(s) are used during simulation or when generating code for the model. To determine which choice(s) are active, a variant block, may have conditions associated with each choice. The condition may be in the form of an expression, such as EngType==1 && FuelType==2, where the independent variables of the condition are referred to as variant control variables. Alternatively, a label may be associated with each choice and prior to analysis of the model for simulation or code generation, the user may specify which labels are active.

In order to cause a model to implement a particular configuration, a set of values of variant control variables may be organized into a variant configuration. A user may define a number of different variant configurations each with a different set of values for the variant control variables. For a given simulation of a model or code generation process, a particular variant configuration may be selected thereby causing particular variant choices to be active and inactive.

To simulate a complex system, a simulation model may include hundreds or thousands of model elements and may support numerous alternative configurations using variants. Unintended modeling errors may arise as a result of this complexity. For example, model elements included in a variant choice or region may end up always being active. Such model elements should be moved outside of the variant choice. Other model elements included in a variant choice may never be active, which may indicate a modeling error. Identifying such occurrences can result in improved model design and performance.

The present disclosure relates to systems and methods for analyzing a simulation model that includes model elements configured to operate as variants. The systems and methods analyze the simulation model over a group of variant configurations each of which includes a set of variant conditions defined for the simulation model and may include values of variant control variables utilized by the variant conditions. For each variant configuration in the group, the systems and methods determine which model elements configured to operate as variants are active and which model elements are inactive. For example, the systems and methods may generate a mapping between each variant configuration and the model elements that are active and inactive for that variant configuration. The systems and methods may then analyze these mappings and determine which model elements, if any, are always active, are never active, or are sometimes active for the group of variant configurations for which the model was analyzed. The systems and methods may provide a visualization tool presenting information regarding the model elements determined to be always active, the model elements determined to be never active, and the model elements determined to be sometimes active. To determine which variant choices are active or not, static analysis may be performed. For example, the model or a portion thereof may be compiled but not run. The visualization tool may present the information in the form of a heatmap, a textual report, an annotated version of the simulation model, an abstract graph representation of the simulation model, etc.

The results produced by the visualization tool may aid a user in understanding the variant nature of the model. In addition to increasing the understanding of the variant nature of the model, the present disclosure may help a user identify model mistakes. For example, if a given variant choice is always active for the group of variant configurations, then either an insufficient number of configurations was specified, or the model should be changed such that this portion of the model logic is not variant. The results produced by the visualization tool may give an N-way difference of the variant configurations and the visualization tool may allow the user to verify that the differences between configurations are correct. Understanding the differences between the configurations may be important to ensure that the model is tested and deployed correctly for each different variation. Testing confidence may increase when the user knows what happens with the different variant configurations. Variants add complexity to a model and the visualization tool visualizes the complexity between the different variations, thus allowing the user to manage the complexity introduced in the model by the variants. Therefore, the tool helps in model creation and debugging, test generation, and improved speed and confidence in model construction and maintenance.

Implementations of the present disclosure may assist a user in identifying particular model portions that may cause the model to perform in a non-optimal, unexpected, and/or undesired manner, e.g., inefficiently, incorrectly, etc. Implementations of the present disclosure may reduce the time needed to debug and/or troubleshoot a simulation model. Following debugging and/or troubleshooting, the model may run more efficiently, e.g., reducing the processing resources and/or memory resources needed to execute a simulation or producing more efficient code generated from a model, e.g., fewer lines of code, faster execution, etc.

In some embodiments, the systems and methods may access requirements specified for a simulation model. The requirements may be linked to model elements of the model and at least some of the model elements to which requirements are linked may be configured to operate as variants. The systems and methods may analyze the requirements for a group of variant configurations defined for the model. For each requirement, the systems and methods may determine whether the model elements linked to the requirement are always active, never active, or sometimes active over the group of variant configurations. The systems and methods may provide a visualization tool presenting information on the activeness of the requirements. For example, suppose a requirement is that a simulation model for a vehicle be able to support either a single electric motor in the front of the vehicle or a dual motor, one in the front and one in the rear. If the analysis of the present disclosure indicates the single motor variant portion of the model is never active, then the requirement is not met.

Figure 1B:
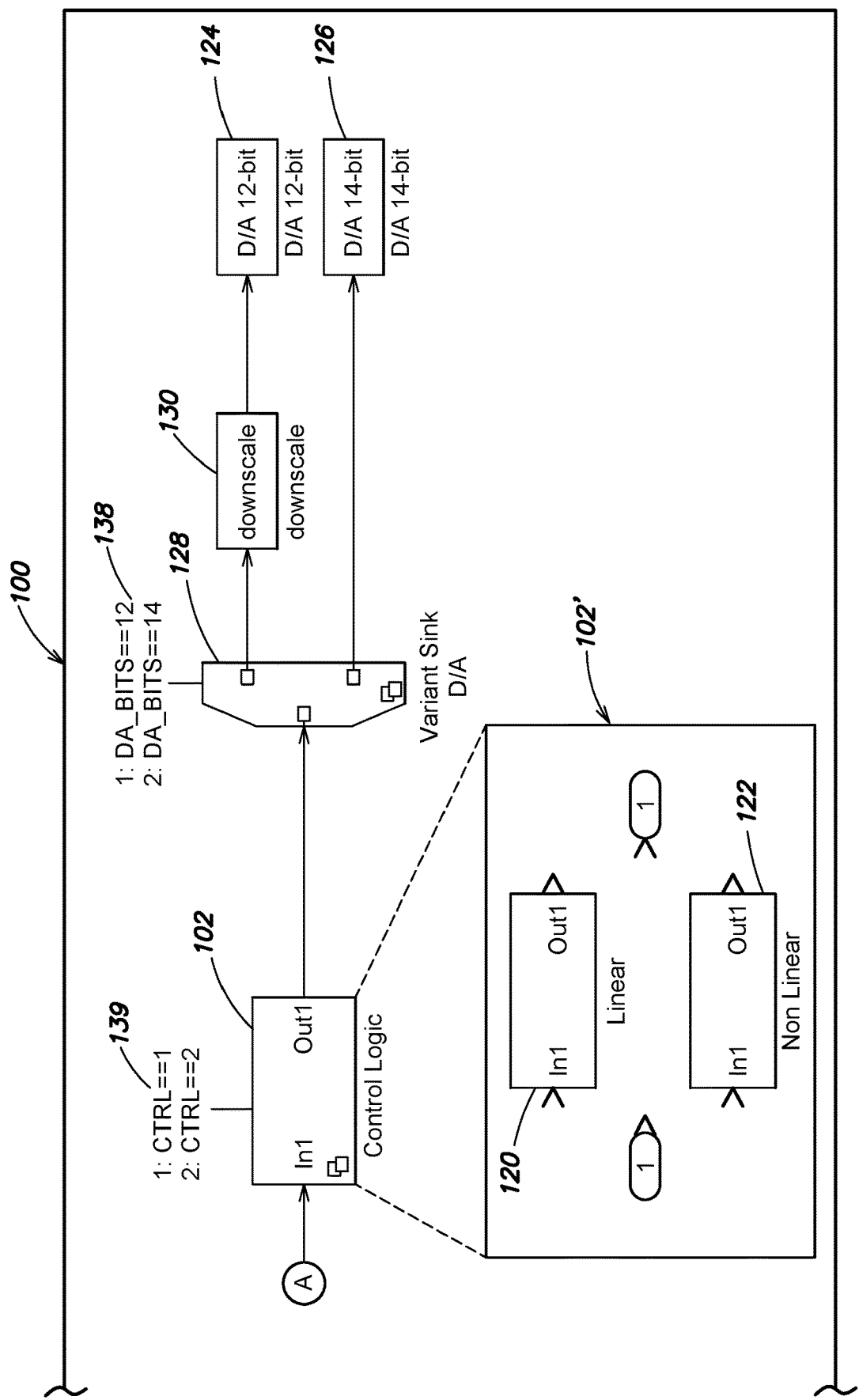

FIGS. 1A and 1B are partial views of an illustration of an example executable simulation model 100 for a controller, e.g., of a vehicle, airplane, heating system, etc., in accordance with one or more embodiments. The simulation model 100 may include a plurality of interconnected blocks. Specifically, the model 100 may include a subsystem block 102 that implements the control logic of the controller being simulated. Other blocks connect the control logic to the physical world, e.g., to sensors and actuators. The simulation model 100 also includes variant blocks so that the one simulation model 100 may support multiple, different configurations. Specifically, the simulation model 100 may include four Analog-to-Digital (A/D) device driver blocks that may convert analog signals from one or more sensors to digital signals for processing by the model 100. The A/D device driver blocks 104 and 105 model 12-bit A/D converters from different vendors, e.g., Vendor A and Vendor B, for providing an input signal from one sensor. The A/D device driver blocks 106 and 107 model 14-bit A/D converters for providing input signals from a first sensor and a second sensor. The model 100 also may include a Variant Source block 108 labeled 'Variant Source 12-bit A/D' that may be controlled to choose between the blocks 104 and 105 representing the A/D converter from Vendor A and the A/D converter from Vendor B. The model 100 also includes a Variant Source block 110 labeled 'Variant Source 12 or 14-bit' that may be controlled to choose between one of the 12-bit A/D converters as modeled by the A/D device driver blocks 104 and 105 and the 14-bit A/C converter for the first sensor as modeled by the A/D converter block 106. The model 100 also may include a Variant Source block labeled 'Variant Source Single or Redundant Sensors' that may be controlled to choose between one or two sensors as input.

The model 100 may include an upscale block 114 that scales the 12-bit signal from either of the A/D device driver blocks 104 and 105 to have the same range as a 14-bit signal to ensure that the Control Logic subsystem block 102 receives a consistent signal value regardless of which of the four A/D device driver blocks 104-107 are active. The model 100 may also include a subsystem block 116 labeled 'Fault Detection and Correction' that implements an algorithm to eliminate sporadic faulty signals. The model 100 also may include a subsystem block 118 labeled 'Reject Bad Sensor' that implements an algorithm to reject the signal from either the first or the second sensor.

In some embodiments, the Control Logic subsystem block 102 may be a Variant Subsystem block that implements alternative control algorithms. For example, as shown in the opened or expanded view 102', the Control Logic subsystem may implement both a linear control algorithm as indicated at child subsystem block 120 and a non-linear control algorithm as indicated at child subsystem block 122.

The model 100 also may include two Digital-to-Analog (D/A) device driver blocks 124 and 126 that simulate 12-bit and 14-bit D/A converters, respectively, for driving an actuator or other system or other component being controlled. The model 100 may include a Variant Sink block 128 labeled 'Variant Sink D/A' for selecting between the two D/A device driver blocks 124 and 126. The model 100 may include a downscale block 130 that scales the output of the Control Logic subsystem block 102 to have the same range when using the 12-bit D/A converter.

Variant control variables may be associated with the variant blocks 102, 108, 110, 112, and 128 to determine which of the variant choices is active. For example, a variant control variable named 'VENDOR' whose value may be 'VENDORS.A' or 'VENDORS.B' may be associated with the Variant Source block 108, as indicated at 132. A variant control variable named 'AD_BITS' whose value may be 12 or 14 may be associated with the Variant Source block 110 as indicated at 134. A variant control variable named 'SENSOR' whose value may be 'SENSORS.SINGLE' or 'SENSORS.REDUNDANT' may be associated with the Variant Source block 112 as indicated at 136. A variant control variable named 'DA_BITS' whose value may be 12 or 14 may be associated with the Variant Sink block 128 as indicated at 138. A variant control variable named 'CTRL' whose value may be 1 or 2 may be associated with the Variant subsystem block 102 as indicated at 139.

The model 100 provides twenty-four different combinations of variant control variable values. Accordingly, it can be difficult, even for a model as relatively simple as the model 100, to understand which model elements are active in various combinations of variant control variable values. Models of complex systems, today, often consist of hundreds of thousands of model elements with thousands of variants. Therefore, manual analysis can be impractical if not impossible. The present disclosure includes a tool for analyzing variant configurations enabling the construction of models that meet desired requirements, among other advantages.

In some embodiments, a user may define one or more variant configurations for the model 100. Each variant configuration may include a different combination of variant control variable values. For example, suppose the user defines four variant configurations for the model 100 as illustrated in Table I below.

TABLE I

| Variant Configuration | Variant Control Variables |
|---|---|
| C1 | SENSOR=SENSORS.SINGLE, AD_BITS=12, VENDOR=VENDORS.A, DA_BITS=12, CTRL = 1 |
| C2 | SENSOR=SENSORS.SINGLE, AD_BITS=12, VENDOR=VENDORS.B, DA_BITS=12, CTRL = 1 |
| C3 | SENSOR=SENSORS.REDUNDANT, AD_BITS=12, VENDOR=VENDORS.A, DA_BITS=12, CTRL = 2 |
| C4 | SENSOR=SENSORS.REDUNDANT, AD_BITS=12, VENDOR=VENDORS.B, DA_BITS=12, CTRL = 2 |

These variant configurations may be provided as part of the model construction. Each variant configuration defines a set of variant control variable values for variant conditions. During model compile, the conditions are used to determine the run-time behavior of the model. The conditions are evaluated during model compile and the inactive variants maybe removed from the model or from a model representation, such as an intermediate representation or a (temporary) version of the model during the compilation. Alternatively, the conditions may be evaluated in the generated code using preprocessor conditionals or run-time conditionals. In some embodiments, the systems and methods may propagate, during model compile, the variant conditions included in the variant configurations to model elements of the model 100.

The systems and methods may evaluate the variant conditions included in the variant configurations using the variant control variables. For each variant condition included in the variant configurations, the systems and methods may determine which model elements of the model 100 are active. The systems and methods may review the determinations of activeness for the model elements and determine which model elements, if any, are always active no matter what variant configuration is selected, which model elements, if any, are never active no matter what variant configuration is selected, and which model elements are partially active, i.e., active in some but not all of the variant configurations. The systems and methods may generate a report of the always, never, and partially active status of the model elements. In some embodiments, the systems and methods may present, e.g., display, the report. The presentation especially aids in understanding large simulation models where it can be impractical if not impossible to manually analyze the model to determine the active status of the model's variant choices.

FIG. 2 is an illustration of an example User Interface (UI) 200 presenting results of a variant configuration analysis for the model 100 in accordance with one or more embodiments. The UI 200 may include a region 202 that presents the results of the analysis, another region 204 for filtering the information presented in the region 202, and a further region 206 that maps variant conditions to the abbreviations used in the region 202.

The region 202 may present the results of the configuration analysis of the model 100 in the form of a heat map having rows and columns that define cells presenting information. For example, the heat map may include a plurality of rows 208a-p where each row corresponds to a particular model element of the model 100 and a plurality of columns 210-215 for presenting variant configuration analysis results for the model elements. The column 210 labeled 'Activeness' may present a graphical affordance indicating whether the respective model element is never active, always active, or partially active for the analyzed variant configurations. The column 211 labeled 'Model Hierarchy' may identify the model element, e.g., by name. Graphical affordances, such as triangles, may be included in rows for hierarchical model elements. In response to selection of the triangles, rows for the model elements contained in a hierarchical model element may be added or removed from the region 202. The columns 212-215 labeled 'C1', 'C2', 'C3', and 'C4' represent the variant configurations for which the model 100 was analyzed and include the results of the configuration analysis.

In some embodiments, graphical affordances may be presented in the cells defined by the rows 208 and the columns 212-215 to indicate whether a model element is active for the respective variant configuration. For example, a checkmark may be used to indicate that the model element is active for the variant configuration. Rows 208c and 208d illustrate that the 12-bit D/A device driver block 124 is active for variant configuration C1, while 14-bit D/A device driver block 126 is not active for variant configuration C1. In addition, a heatmap may be included in the region 202. For example, different colors or grayscale shading may be used in the columns 212-215 to indicate whether a model element is always active, never active, or partially active for the analyzed variant configurations. A row that is completely, e.g., entirely, shaded and/or has no checkmarks for any of the variant configurations, such as row 208d, indicates that the model element, e.g., the 14-bit D/A device driver block 126, is never active for any of the variant configurations. A row with no shading at all and/or checkmarks for all of the variant configurations, such as row 208c, indicates that the model element, e.g., the 12-bit D/A device driver block 124 is always active for all of the variant configurations. A row with some shading, such as row 208l, indicates that the model element, e.g., the 12-bit A/D device driver block from Vendor B, is sometimes, but not always active, e.g., active for variant configuration C2 but inactive for variant configurations C1, C3 and C4.

In addition to the graphical affordances, information identifying the variant conditions propagated to the model elements may be presented in the columns 212-215. Because the variant conditions propagated to model elements can become complex, annotations, abbreviations, or symbols may be presented in the columns 212-215 instead of the variant conditions themselves. These annotations, abbreviations, or symbols may take the form c:# where 'c' stands for variant condition and '#' stands for the variant condition count within the model 100, e.g., starting from '0'.

The region 206 may identify the variant conditions associated with the annotations, abbreviations, or symbols used in the region 202. The region 206 may present information in the form of a table having rows and columns that define cells presenting information. For example, the table may include a plurality of rows 222a-f and a plurality of columns 224 and 226 where each row corresponds to a particular annotation, abbreviation, or symbol. The column 224 labeled 'Annotation' may identify the annotations, abbreviations, or symbols and the column 226 labeled 'Condition' may present the variant conditions represented by the respective annotations, abbreviations, or symbols.

As illustrated, the UI 200 presents the results of the configuration analysis performed by the systems and methods in a way that aids in debugging the model 100. For example, if the region 202 reveals one or more model elements that are never active, then the model 100 may have a design error. Alternatively, the model elements that are never active could be due to missing model configurations, in which case configurations need to be added to the model. Therefore, using the variant configuration analysis tool, a user can ensure that verification and validation testing of the model across all configurations is fully covered using the variant configurations. If the region 202 reveals one or more model elements that are always active, then better modeling practices may call for moving those model elements out of a variant region and placing them in the model's always present common algorithmic structure. This may help in reducing model complexity and reducing the testing requirements. The UI 200 may also reveal a model element that was meant to be active for a given variant configuration but is inactive for that variant configuration or vice versa. For example, if a given configuration for a gas engine is activating a choice for a diesel engine, then by inspection or automation through requirements verification, a user can determine using the tool that a modeling error exists, and may correct the modeling error.

The region 204 may include user interface elements for filtering the information presented in the region 202. In some embodiments, the region 204 may include a search field 216, a drop-down menu 218 and radio buttons 220a-c. In response to a user entering a block name in the search field 216, only rows 208 for blocks matching that name, if any, may be presented in the region 202. In some embodiments, the search field 216 may support regular expression matching including the use of wildcards, such as *, !, and ?. All blocks satisfying a regular expression entered in the search field 216 may be presented in the region 202. The drop-down menu 218 may present options for filtering which model elements, e.g., blocks, of a model are included in the region 202. The options may include all blocks as shown or only variant and hierarchical blocks. In other embodiments, other filter options may be provided, such as filtering based on block type, filtering on other model elements, such as signals (where the shown element may be the blocks connected to a signal), ports (of a block), states (in a Statechart), subsystems, parameters (where the shown element may be the blocks where a variant parameter is used), objects such as Bus objects (where the shown element may be the blocks connected to the object), etc. The radio buttons 220a-c may be selected/deselected to present model elements determined to be always active, partially, e.g., sometimes, active, or never active, respectively. By using these capabilities, the user can obtain different views of the variant configuration analysis, thus making it easier to verify correctness of the model. Using these capabilities, for example, a user can zoom in on items of interest, e.g. to see only the items that are never active and then take corrective action to address the issue, e.g., by either adding more variant configurations or altering the model to not have always inactive variant choices.

Figure 3:
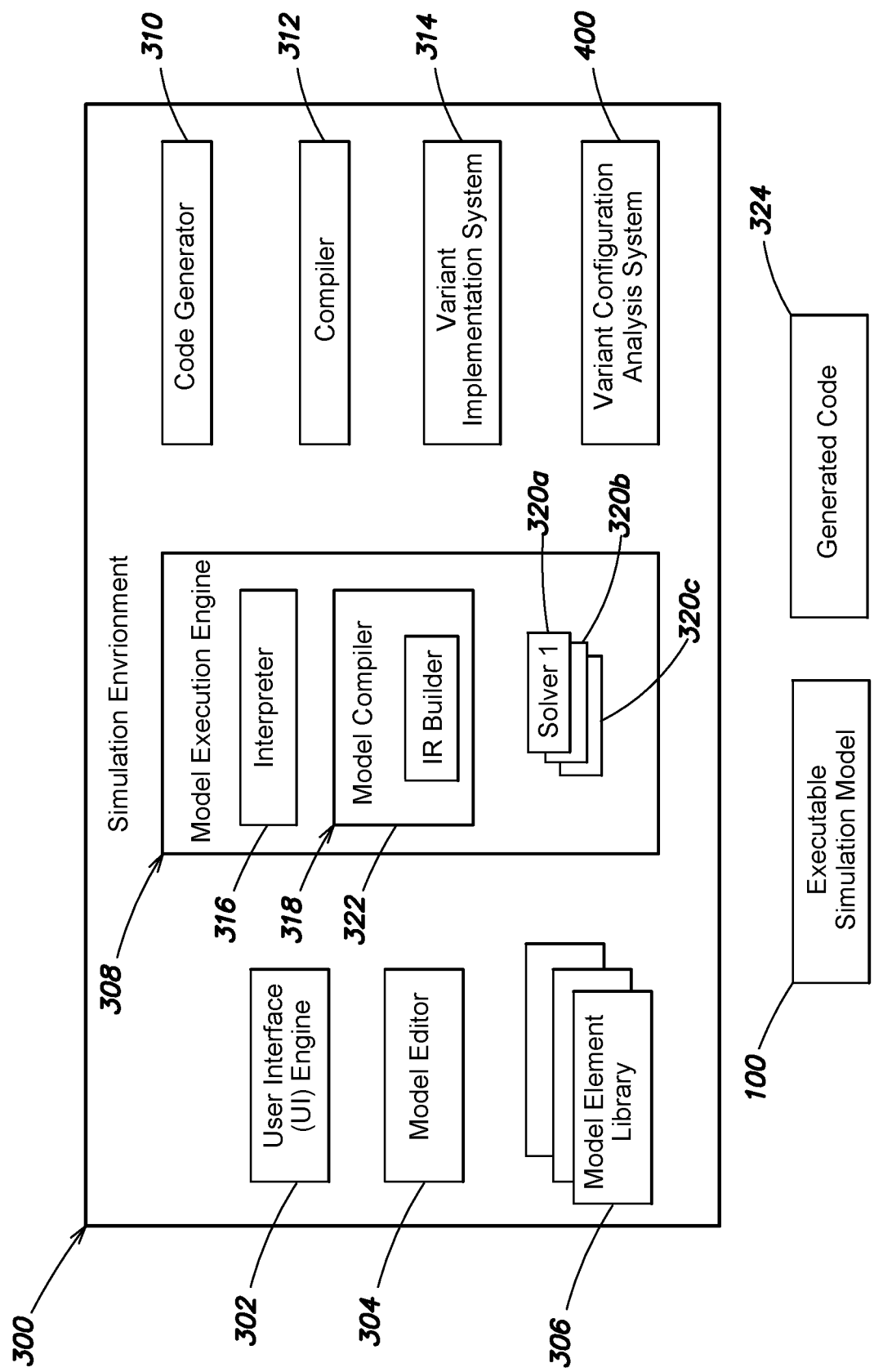
FIG. 3 is a partial, functional diagram of an example simulation environment in accordance with one or more embodiments.

FIG. 3 is a partial, functional diagram of an example simulation environment 300 in accordance with one or more embodiments. The simulation environment 300 may include a User Interface (UI) engine 302, a model editor 304, one or more model element libraries indicated at 306, a model execution engine 308, a code generator 310, a compiler 312, a variant implementation system 314, and a variant configuration analysis system 400. In an alternative implementation, the variant configuration analysis system 400 and the variant implementation system 314 can be part of the compiler, i.e. the existing compiler can perform the variant processing aspects. Additionally or alternatively, the functionality of the variant configuration analysis system 400 may be included in the variant implementation system 314. The UI engine 302 may create and present one or more User Interfaces (UIs), such as Graphical User Interfaces (GUIs) and/or Command Line Interfaces (CLIs), on the display of a workstation, laptop, tablet, or other data processing device. The GUIs and CLIs may provide a user interface to the simulation environment 300, such as a model editing window. The model element libraries 306 may contain a plurality of model element types, at least some of which may come preloaded with the simulation environment 300 while others may be custom created, e.g., by a user. A user may select model elements types from the library 306 to add instances of the selected model element types to a model being created and/or edited. The model editor 304 may perform selected operations on a model, such as open, create, edit, and save, in response to user inputs or programmatically.

The model execution engine 308 may include an interpreter 316, a model compiler 318, and one or more solvers, such as solvers 320a-c. The model compiler 318 may include one or more Intermediate Representation (IR) builders, such as IR builder 322, which may construct one or more in-memory IRs of a model. In some implementations, one or more IR builders may be included or associated with the solvers 320a-c.

The simulation environment 300 may access one or more computer-based, executable models or a portion thereof, such as the executable simulation model 100, which may be a graphical, e.g., block diagram, model. The model execution engine 308 may execute, e.g., compile and run or interpret, the model 100 using one or more of the solvers 320a-c. Exemplary solvers include one or more fixed-step continuous time solvers, which may utilize numerical integration techniques, and one or more variable-step solvers, which may for example be based on the Runge-Kutta and Dormand-Prince method. With a fixed-step solver, the step size remains constant throughout simulation of the model. With a variable-step solver, the step size can vary from step to step, for example to meet error tolerances. A non-exhaustive description of suitable solvers may be found in the *Simulink User's Guide* from The Math Works, Inc. (September 2019 ed.)

The code generator 310 may generate code, such as generated code 324, for the model 100. For example, the user interface engine 302 may provide or support a code generation button in a GUI that may be selected by the user, or the user interface engine 302 may receive a code generation command entered by the user, e.g., in the GUI or the CLI. The code generation command also may be invoked programmatically, for example, when a particular event occurs. In response to the code generation command being activated, the code generator 310 may generate code, such as the generated code 324, for the model 100 or a portion thereof. The behavior of the generated code 324 may be functionally equivalent to the behavior of the executable simulation model 100.

The generated code 324 may be textual code, such as textual source code, that may be compiled, for example by the compiler 312, and executed on a target machine or device, which may not include a modeling environment and/or a model execution engine. The generated code 324 may conform to one or more programming languages, such as Ada, Basic, C, C++, C#, SystemC, FORTRAN, VHDL, Verilog, a vendor or target specific HDL code, such as Xilinx FPGA libraries, assembly code, etc. The generated code 324 may include header, main, make, and other source files. The compiler 312 may compile the generated code for execution by target hardware, such as a microprocessor, a Digital Signal Processor (DSP), Central Processor Unit (CPU), a Graphics Processor Unit (GPU), etc. In some embodiments, the generated code 324 may be accessed by a hardware synthesis tool chain, which may configure a programmable logic device, such as a Field Programmable Gate Array (FPGA), a System on a Chip (SoC), etc., from the generated code 324. The model 100 and the generated code 324 may be stored in memory, e.g., persistent memory, such as a hard drive or flash memory, of a data processing device. The simulation environment 300 may be loaded into and run from the main memory of a data processing device.

In some implementations, the code generator 310 and/or the compiler 312 may be separate from the simulation environment 300. For example, one or both of them may be separate application programs. The code generator 310 and/or the compiler 312 may also be run on different data processing devices than the data processing device running the simulation environment 300. In such embodiments, the code generator 310 may access the model 100, e.g., from memory, and generate the generated code 324 without interacting with the modeling environment 300.

In some embodiments, the simulation environment 300 may implement a declarative language. A declarative language is a language that expresses the logic of a computation without describing its control flow. A declarative language may describe what a program must accomplish in terms of the problem domain, rather than describe how to accomplish it as a sequence of the programming language primitives. In some cases, a declarative language may implement single assignment in which variables are assigned once and only once. Examples of environments that support declarative language elements (but may also support nondeclarative functionality) include the Simulink® model-based design environment from The Math Works, Inc. of Natick, MA, the Modelica modeling language from the Modelica Association, the LabVIEW graphical programming system from National Instruments Corp., Hardware Description Language (HDL), the Prolog language, and the Haskell language, among others. Behaviors of at least some of the model elements of a model constructed or opened in the simulation environment 300 may include computational implementations that are implicitly defined by a declarative language. Alternatively, in some embodiments, the simulation environment 300 may support imperative languages, such as C/C++, MATLAB, or other textual languages which may be incorporated into a block diagram through domain specific blocks that support variation.

As described, the executable simulation model 100 may include a common algorithmic structure that may be fixed, and one or more variant regions each containing one or more alternative algorithmic substructures, e.g., variant choices. As illustrated, the model 100 also may include multiple hierarchical levels. The execution behavior of a hierarchical model element, such as a subsystem, may be context dependent. That is, at least some of the parameters of the model elements contained in a subsystem, such as data type, data dimension, and sample time, may be undefined. Values for these parameters may be inherited from the model in which the subsystem is executed. In some implementations, execution of the model elements contained in a subsystem may be interleaved with the execution of other model elements of the model. In other implementations, the model elements contained in a subsystem may execute atomically. In addition, in some implementations, a subsystem may be configured for conditional execution, and the subsystem may execute when the condition is satisfied. Examples of conditionally executed subsystems include triggered, enabled, action and iterator, triggered and enabled, and function call.

A sub-model also may contain model elements, and may be represented at a given hierarchical level by a single model reference block. However, the execution behavior of a sub-model may be independent of the model in which it is located, and the model elements of a sub-model may execute as a unit.

Figure 4:
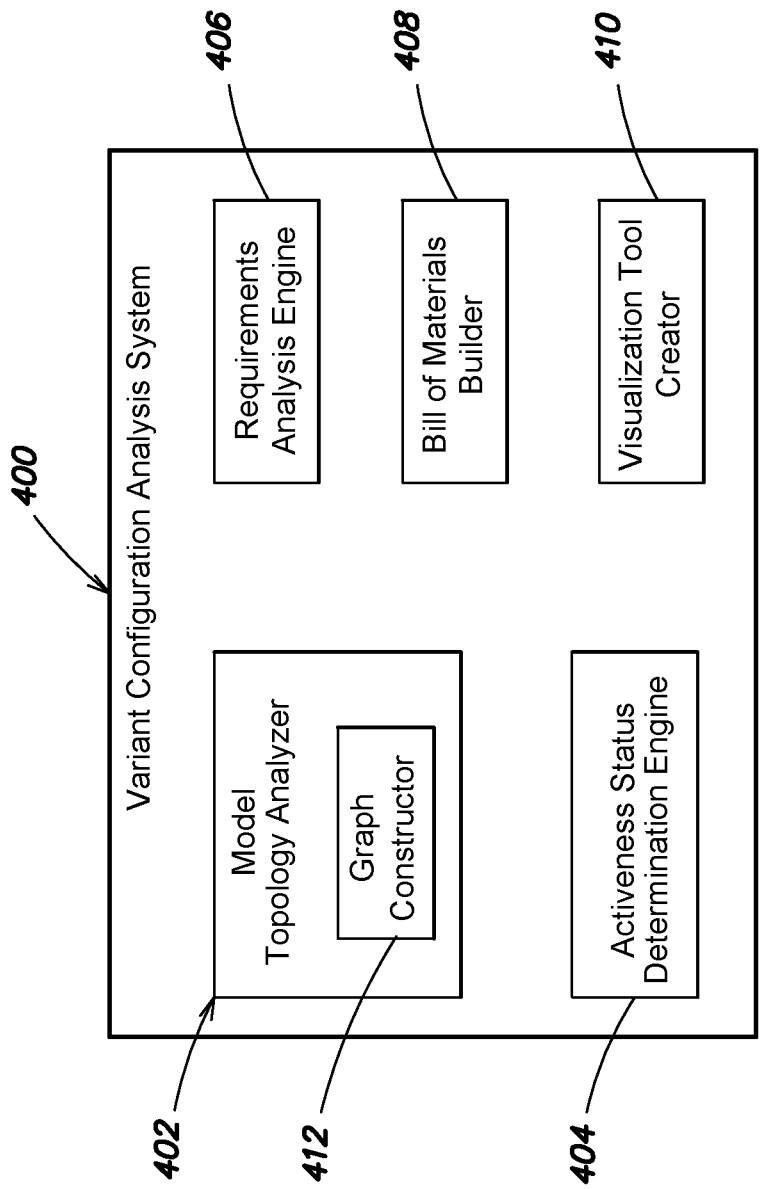
FIG. 4 is a partial, functional diagram of an example variant configuration analysis system in accordance with one or more embodiments.

FIG. 4 is a partial, functional diagram of an example variant configuration analysis system 400 in accordance with one or more embodiments. The variant configuration analysis system 400 may include a model topology analyzer 402, an activeness status determination engine 404, a requirements analysis engine 406, a bill of materials builder 408, and a visualization tool creator 410. The model topology analyzer 402 may include a graph constructor 412. It should be understood that FIG. 4 is for purposes of illustration and the functionality represented by one or more of the model topology analyzer 402, the activeness status determination engine 404, the requirements analysis engine 406, the bill of materials builder 408, the visualization tool creator 410, and the graph constructor 412 may be implemented in other ways, such as incorporating the functionality indicated by these modules as part of the simulation environment, 300. The functionalities indicated by the modules of the variant configuration analysis system 400 represent the functionality, not necessarily independent software units.

In some embodiments, the variant configuration analysis system 400 or a portion thereof may be implemented through one or more software modules or libraries containing program instructions that perform the methods described herein, among other methods. The software modules may be stored in one or more memories, such as a main memory, a persistent memory and/or a computer readable media, of a workstation, server, or other data processing machine or device, and executed by one or more processors. Other computer readable media may also be used to store and execute these program instructions, such as non-transitory computer readable media, including optical, magnetic, or magneto-optical media.

In some embodiments, the variant configuration analysis system 400 or portion thereof may comprise hardware registers and combinational logic configured and arranged to produce sequential logic circuits. In some embodiments, various combinations of software and hardware, including firmware, may be utilized to implement the described methods.

The simulation environment 300 may be a high-level modeling application program. Suitable high-level modeling application programs include the MATLAB® algorithm development environment and the Simulink® model-based design environment from The Math Works, Inc. of Natick, MA, as well as the Simscape physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product from National Instruments Corp. of Austin, TX, the Keysight VEE graphical programming environment from Keysight Technologies, Inc. of Santa Clara, CA, the System Studio model-based signal processing algorithm design and analysis tool, the Dymola modeling and simulation environment from Dassualt Systemes SE of Vélizy-villacoublay, France, the SCADE Suite model-based development environment from Ansys Inc. of Canonsburg, PA, and the SPW signal processing algorithm tool from Synopsys, Inc. of Mountain View, CA, a Unified Modeling Language (UML) system, a Systems Modeling Language (SysML) system, and the System Generator system from Xilinx, Inc. of San Jose, CA. Models created in the high-level modeling environment 200 may be expressed at a level of abstraction that contain less implementation detail, and thus operate at a higher level than certain programming languages, such as the C, C++, C#, and SystemC programming languages.

Those skilled in the art will understand that the MATLAB algorithm development environment is a math-oriented, textual programming environment for digital signal processing (DSP) design, among other uses. The Simulink model-based design environment is a block diagram based design environment for modeling and simulating dynamic systems, among other uses. The MATLAB and Simulink environments provide a number of high-level features that facilitate algorithm development and exploration, and support model-based design, including dynamic typing, array-based operations, data type inferencing, sample time inferencing, and execution order inferencing, among others.

In some embodiments, a programming language, such as the C, C++, C#, and SystemC, programming languages, among others, may be used to create one or more models or portions thereof. These programming languages may be considered to be at lower levels of abstraction as compared to the language of the modeling environment.

Models constructed in the modeling environment 200 may include textual models, graphical models, and combinations of graphical and textual models. A model, when executed, may simulate, e.g., approximate the operation of, a system, such as a natural or man-made system. A model may be considered to be a form of source program, and may implement and/or represent one or more algorithms and/or procedures. Exemplary systems include weather systems, financial systems, plants, controllers for factory automation, electronic control units (ECUs), machine learning components, anti-lock braking systems (ABS), flight controllers, computer vision systems, communication systems, etc. A model may be executed in order to simulate the behavior of the system being modeled, and the execution of a model by and/or within the modeling environment 200 may be referred to as simulating or running the model.

Suitable variant implementation systems 314 are described in U.S. Pat. No. 8,386,222 issued Feb. 26, 2013 for Variants in Graphical Modeling Environments, U.S. Pat. No. 8,700,368 issued Apr. 15, 2014 for Variants in Graphical Modeling Environments, U.S. patent application Ser. No. 15/829,402 filed Dec. 1, 2017 for Variant Modeling Elements in Graphical Programs, now U.S. Pat. No. 10,521, 197, and Simulink User's Guide (September 2019 ed.), which are hereby incorporated by reference in their entireties.

FIGS. 5A-F are partial views of a flow diagram of an example method for performing variant configuration analysis in accordance with one or more embodiments. It should be understood that the flow diagrams described herein are representative only. In some embodiments, one or more steps may be omitted, one or more steps may be optionally performed, multiple steps may be combined or consolidated, additional steps may be added, the order of steps may be changed, and/or one or more sequences as indicated by the arrows of the flow diagram may be omitted, among other alternatives.

The analysis may be performed in response to a request from a user, e.g., by initiating an analysis operation on the model. The variant configuration analysis system 400 may access an executable simulation model to be analyzed, as indicated at block 502. In some embodiments, the model to be analyzed may be opened in the simulation environment 300. The model may include one or more variant model elements that establish variant choices in the model. Exemplary types of variant model elements include Variant Source block, Variant Sink block, and Variant Subsystem block of the Simulink® simulation environment. Variant conditions may be associated with the variant model elements. The variant conditions may include variant control variables and evaluation of the variant conditions determines which of the variant choices defined by that variant model element is active. In some cases, the model will include many, e.g., tens or hundreds of, variant model elements defining many variant choices within the model. In response to user input, the UI engine 302 may present a Graphical User Interface (GUI), e.g., a Variant Manager window, through which a user may manage the variants defined for the model. For example, the Variant Manager window may include graphical affordances through which a user may create, modify and save variant configurations for the model, among other variant-related tasks.

The variant configuration analysis system 400 may receive a selection of a group of variant configurations defined for the model that are to be analyzed as indicated at block 504. For example, a user may select through the Variant Manager window all of the variant configurations defined for the model or something less than all of the model's variant configurations. In some embodiments, all variant configurations defined in the model may be selected, e.g., by default, and thus step 504 is optional.

The variant configuration analysis system 400 may commence and drive analysis of the model, for example in response to user selection of a command button presented on the Variant Manager window. The model topology analyzer 402 may analyze the structure of the model and the graph constructor 412 may create one or more data structures for the model as indicated at block 506. In some embodiments, at least one of the data structures may be a hierarchical tree that includes nodes representing the model elements of the model and edges among the nodes that represent data, control, state transition, event, message, or other dependencies among the model elements. To the extent the model includes hierarchical model elements, the tree may include hierarchical nodes representing the hierarchical model elements. The hierarchical nodes may reference, e.g., link to, sub-trees that contain nodes representing the model elements contained in the respective hierarchical model element. The one or more data structures created by the graph constructor 412 may be saved in memory.

The variant configuration analysis system 400 may create one or more data structures that includes the variant configurations to be analyzed and identifies the variant conditions associated with those variant configurations, as indicated at block 508. In some embodiments, the one or more data structures may be a table having rows for the variant configurations and one or more columns identifying the associated variant conditions. The variant configuration analysis system 400 may access one of the variant configurations from the table that lists the variant configurations to be analyzed, as indicated at block 510. The variant configuration analysis system 400 may retrieve one of the variant conditions associated with the current variant configuration, as indicated at block 512. The current configuration is the one retrieved from step 510.

Figure 5A:
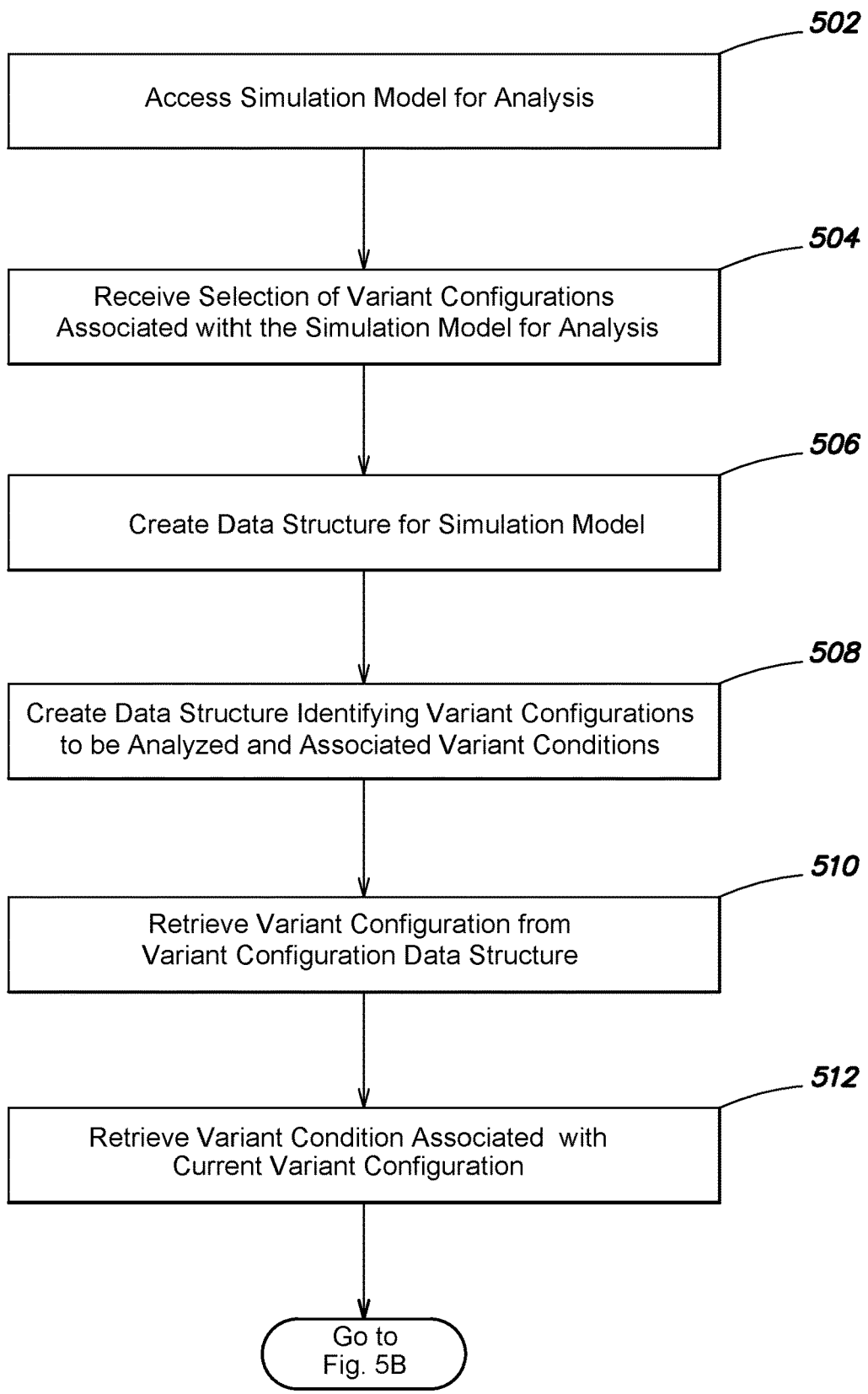
FIGS. 5A-F are partial views of a flow diagram an example method for performing variant configuration analysis in accordance with one or more embodiments.
Figure 5B:
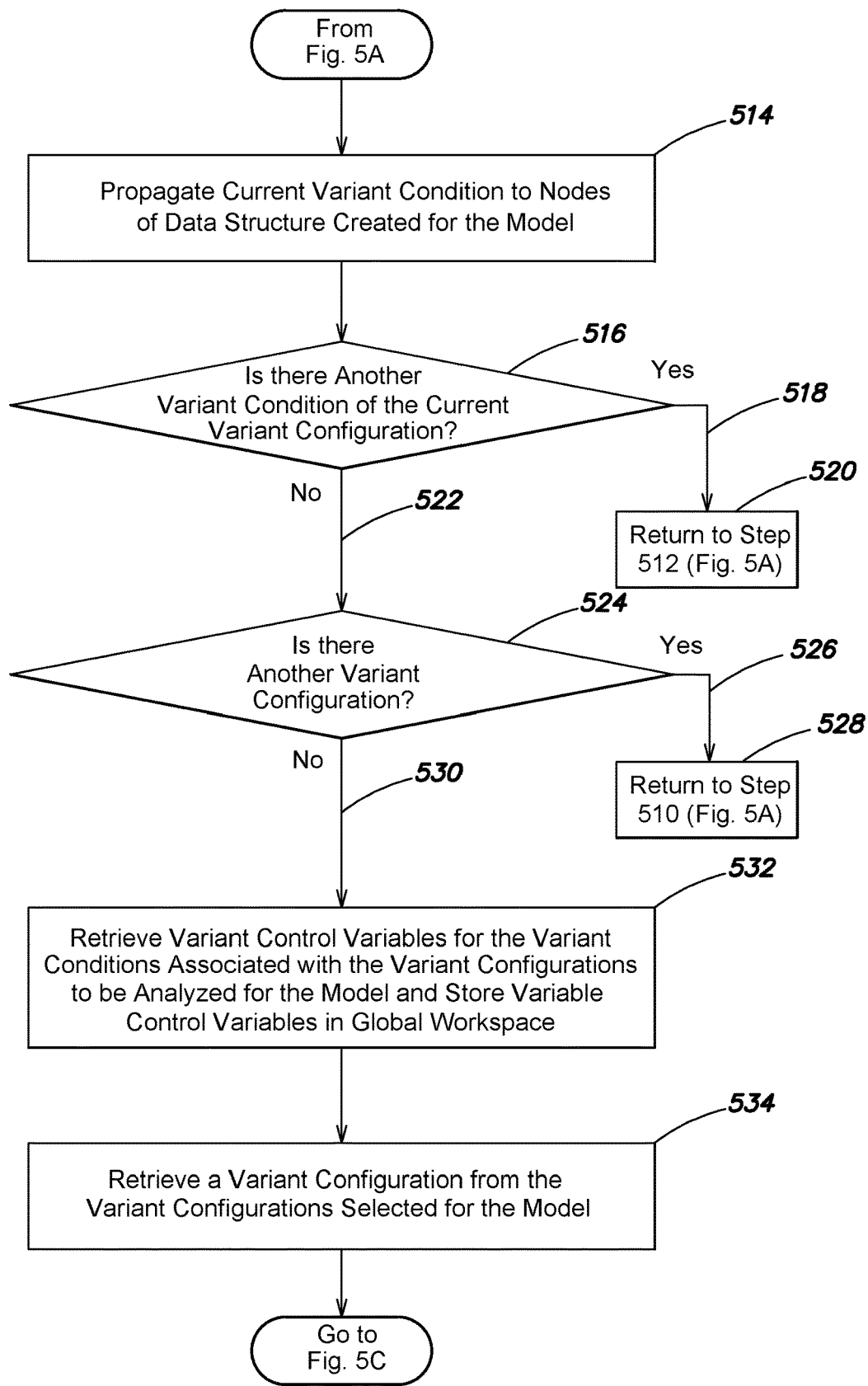

The variant configuration analysis system 400 may direct the variant implementation system 314 to propagate the current variant condition to nodes of the tree created for the model, as indicated at block 514 (FIG. 5B). Propagation may start from the variant model element for which the current variant condition was defined and may be based on one or more variant propagation rules implemented by the variant implementation system 314. In some embodiments, nodes of the tree to which a variant condition is propagated may be annotated with information identifying the variant condition. For example, metadata may be associated with the node and the metadata may identify the variant condition propagated to the node. Suitable techniques for propagating variant conditions within a simulation model, including propagation rules, are described in U.S. patent application Ser. No. 15/829,402 filed Dec. 1, 2017 for Variant Modeling Elements in Graphical Programs, now U.S. Pat. No. 10,521, 197, and Simulink User's Guide (September 2019 ed.), which are hereby incorporated by reference in their entireties.

The variant configuration analysis system 400 may determine whether another variant condition is associated with the current variant configuration being processed, as indicated by decision step 516. If so, processing may return to block 512 (FIG. 5A) as indicated by Yes arrow 518 leading to Go To block 520. The process of retrieving a variant condition associated with the current variant configuration and propagating that variant condition through the model may be repeated until all of the variant conditions associated with the variant condition have been retrieved and propagated. At that point, the variant configuration analysis system 400 may determine if there is another variant configuration to be processed, as indicated by No arrow 522 from decision block 516 leading to decision block 524. If there is another variant configuration from the group of variant configurations being analyzed, processing may return to block 510 (FIG. 5A) at which point the variant configuration analysis system 400 may retrieve a next variant configuration for processing, as indicated by Yes arrow 526 leading to Go To block 528. The process of retrieving a variant configuration and propagating the variant conditions associated with the variant configuration may be repeated until all of the variant configurations of the group and their variant conditions have been retrieved and propagated. At that point, the activeness status determination engine 404 may retrieve the variant control variables for the variant conditions, as indicated by No arrow 530 leading to block 532. The activeness determination engine 404 may store the variant control variables in a global workspace associated with the model. Alternatively, if the model is not using the notion of a global location, e.g. global workspace, for the definition of the variant control variables, the activeness status determination engine 404 may update a local location, e.g. block or model workspaces.

Figure 5C:
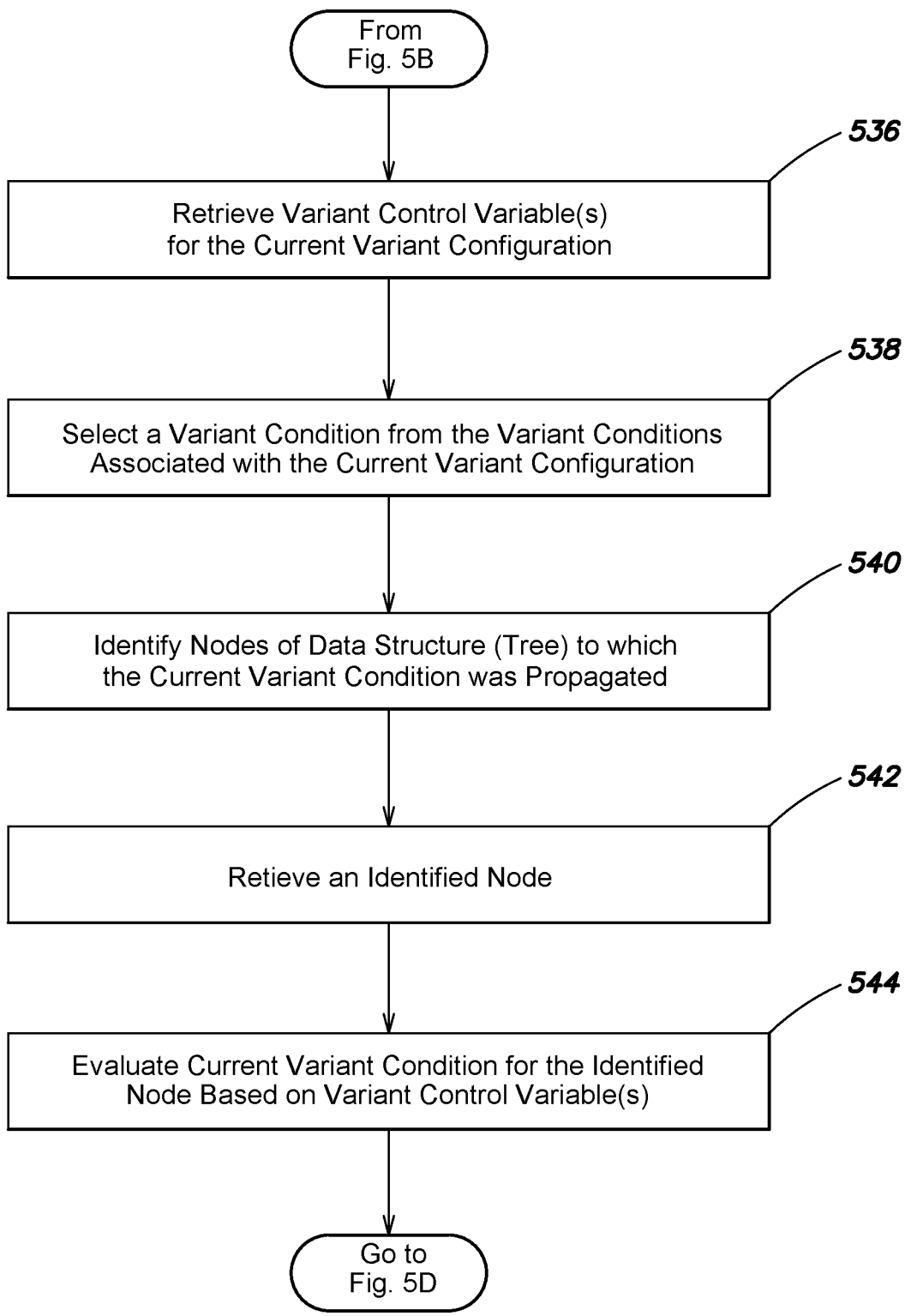

The activeness status determination engine 404 may select a variant configuration of the group of variant configurations for which the model is to be analyzed, as indicated at block 534. The activeness status determination engine 404 may retrieve the variant control variables that are associated with the variant conditions of the current variant configuration, as indicated at block 536 (FIG. 5C). The activeness status determination engine 404 may select a variant condition from the set of variant conditions included in the current variant configuration, as indicated at block 538. The activeness status determination engine 404 may identify the nodes of the tree to which the current variant condition was propagated, as indicated at block 540. The activeness status determination engine 404 may retrieve one of the identified nodes to which the current variant condition was propagated, as indicated at block 542. The activeness status determination engine 404 may evaluate the current variant condition for the identified node using the values of the variant condition variables, as indicated at block 544. The analysis performed by the activeness status determination engine 404 may be static analysis, i.e. it may not run the model. The activeness status determination engine 404 may evaluate the variant conditions using the variant control variables in block 544.

Figure 5D:
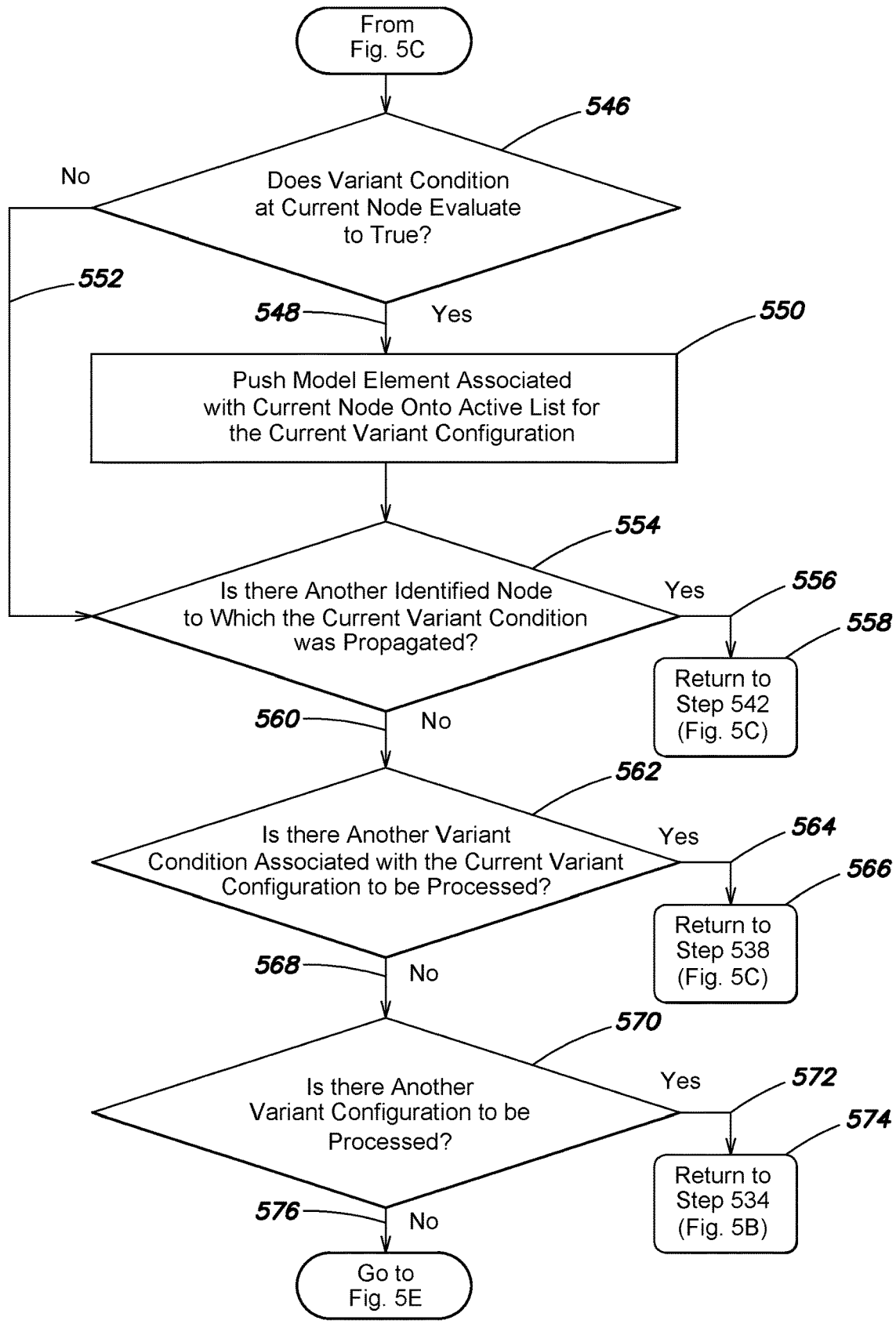

The activeness status determination engine 404 may determine whether the current variant condition as evaluated at the identified node evaluates to true, as indicated at decision block 546 (FIG. 5D). If so, the activeness status determination engine 404 may push, e.g., add, the model element for the current node onto an active list for the current variant configuration, as indicated by Yes arrow 548 leading to block 550. Returning to decision step 546, if the current variant condition as evaluated at the current node did not evaluate to true, the activeness status determination engine 404 may determine whether there is another node of the tree to which the current variant condition being analyzed was propagated, as indicated at by No arrow 552 leading to block 554. Processing may also continue to block 554 following block 550. If there is another node to which the current variant condition was propagated, processing may return to block 542, as indicated by Yes arrow 556 leading to Go To block 558. The process of evaluating the current variant condition at each node to which it was propagated may continue until all nodes to which it was propagated have been processed. At that point, the activeness status determination engine 404 may determine whether there is another variant condition to be processed for the current variant configuration, as indicated by No arrow 560 leading to decision block 562. If so, processing may return to block 538 at which a next variant condition for the current variant configuration may be retrieved and processed, as indicated by Yes arrow 564 leading to Go To block 566.

Returning to decision block 562, once all of the variant conditions for the current variant configuration have been processed, the activeness status determination engine 404 may determine if there is another variant configuration to be processed, as indicated by No arrow 568 leading to decision block 570. If so, processing may return to block 534 at which a next variant configuration from the group of variant configurations to be analyzed for the model may be selected, as indicated by Yes arrow 572 leading to Go To block 574.

Figure 5E:
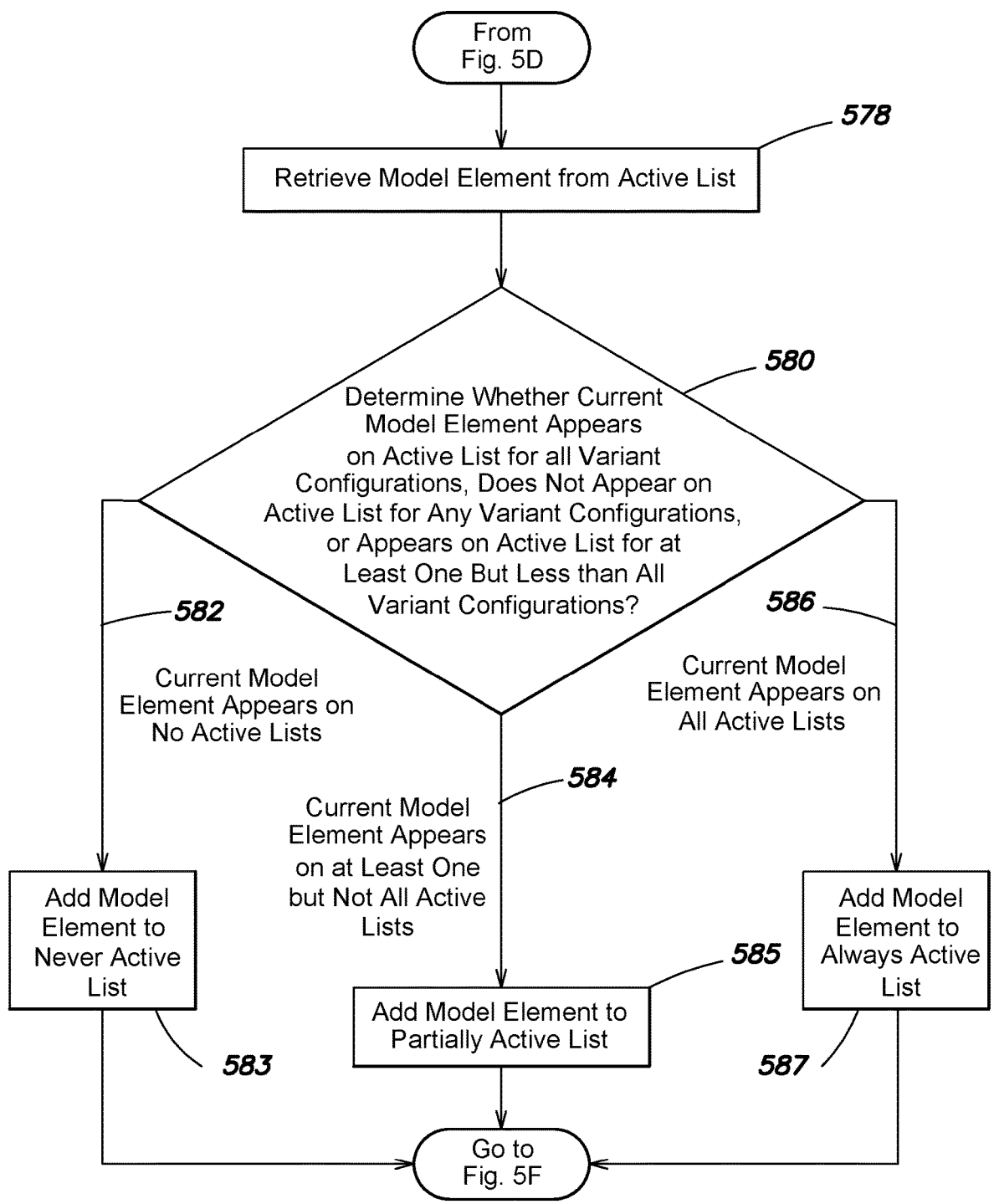

The process of retrieving a variant configuration and evaluating the variant conditions associated with that variant configuration as propagated to the nodes of the tree may be repeated until all of the variant conditions for the group of variant configurations have been evaluated. At that point, the activeness status determination engine 404 may begin analyzing the model elements on the active list, as indicated by No arrow 576 leading to block 578 (FIG. 5E). Specifically, the activeness status determination engine 404 may retrieve a model element e.g. a block, from the active list and determine whether that model element appears on the active list for all of the selected variant configurations of the group, on none of the active lists for the variant configurations, or on at least one but not all of the active lists for all of the variant configurations of the group, as indicated by decision block 580. If the current model element being processed does not appear on any of the active lists, the activeness status determination engine 404 may add the model element to a never active list, as indicated by arrow 582 leading to block 583. If the current model element being processed appears on the active list for at least one variant configuration but not on the active lists for all of them, then the activeness status determination engine 404 may add the model to a partially active list, as indicated by arrow 584 leading to block 585. If the current model element being processed appears on the active list for all of the variant configurations being analyzed, then the activeness status determination engine 404 may add the model element to an always active list, as indicated by arrow 586 leading to block 587.

Figure 6:
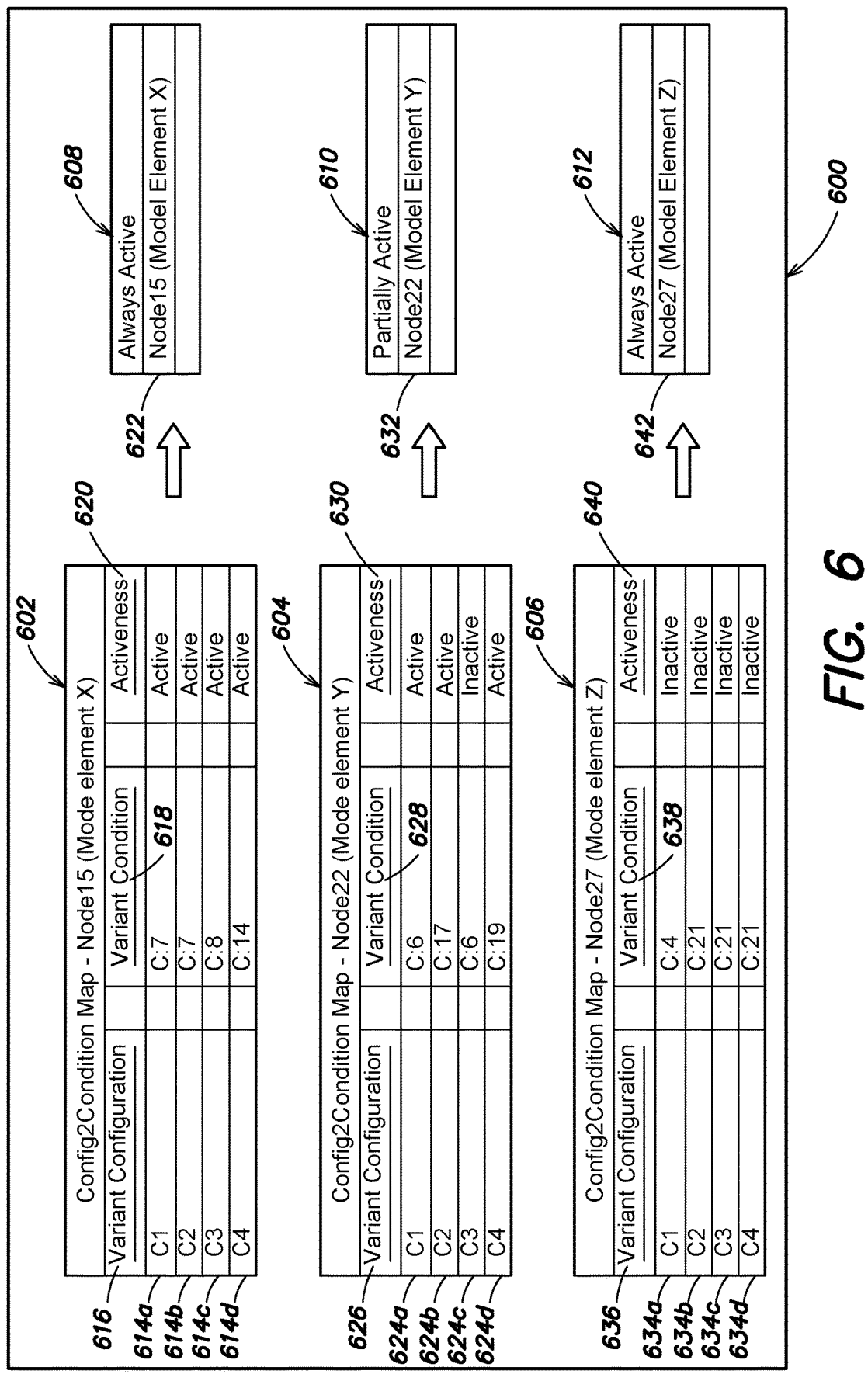
FIG. 6 is a schematic illustration of example data structures for recording the activeness of blocks for variant configurations in accordance with one or more embodiments.

FIG. 6 is a schematic illustration 600 of example data structures for recording the activeness of model elements in accordance with one or more embodiments. The illustration 600 includes three variant configuration-to-variant condition (Config2Condition) maps 602, 604, and 606. Each of the Config2Condition maps 602, 604, and 606 correspond to a node of a tree created for a model, e.g., nodes 15, 22, and 27 as examples. The nodes 15, 22, and 27 correspond to model elements of the model, e.g., model elements X, Y, and Z as examples. The exemplary illustration 600 also includes an always active list 608, a partially active list 610, and a never active list 612. The maps 602, 604, and 606 may be arranged as tables having rows and columns defining cells for storing information. For example, the map 602 may include rows 614a-d and columns 616, 618, and 620. The rows 614a-d correspond to the variant configurations C1-C4. Column 616 identifies the variant configuration. Column 618 identifies the variant condition propagated to the model element X for the respective variant configuration. The variant condition may be identified by an annotation, for example of the form 'c:#' as described herein. Column 620 provides the result of the evaluation of the respective variant condition, e.g., active or inactive. As shown in the exemplary illustration 600, the variant configuration analysis system 400 determined that model element X is active for all four variant configurations C1-C4. Accordingly, the variant configuration analysis system 400 may add the model element X to the always active list 608 as indicated at row 622.

The map 604, which corresponds to model element Y, may include four rows 624a-d and three columns 626, 628, and 630. The rows 624a-d correspond to the variant configurations C1-C4. As shown, the variant configuration analysis system 400 determined that model element Y is active for variant configurations C1, C2, and C4, but is inactive for variant configuration C3. Accordingly, the variant configuration analysis system 400 may add the model element Y to the partially active list 610 as indicated at row 632.

The map 606, which corresponds to model element Z, may include four rows 634a-d and three columns 636, 638, and 640. The rows 634a-d correspond to the variant configurations C1-C4. As shown, the variant configuration analysis system 400 determined that model element Z is inactive for all four variant configurations C1-C4. Accordingly, the variant configuration analysis system 400 may add the model element Z to the never active list 612 as indicated at row 642.

Figure 5F:
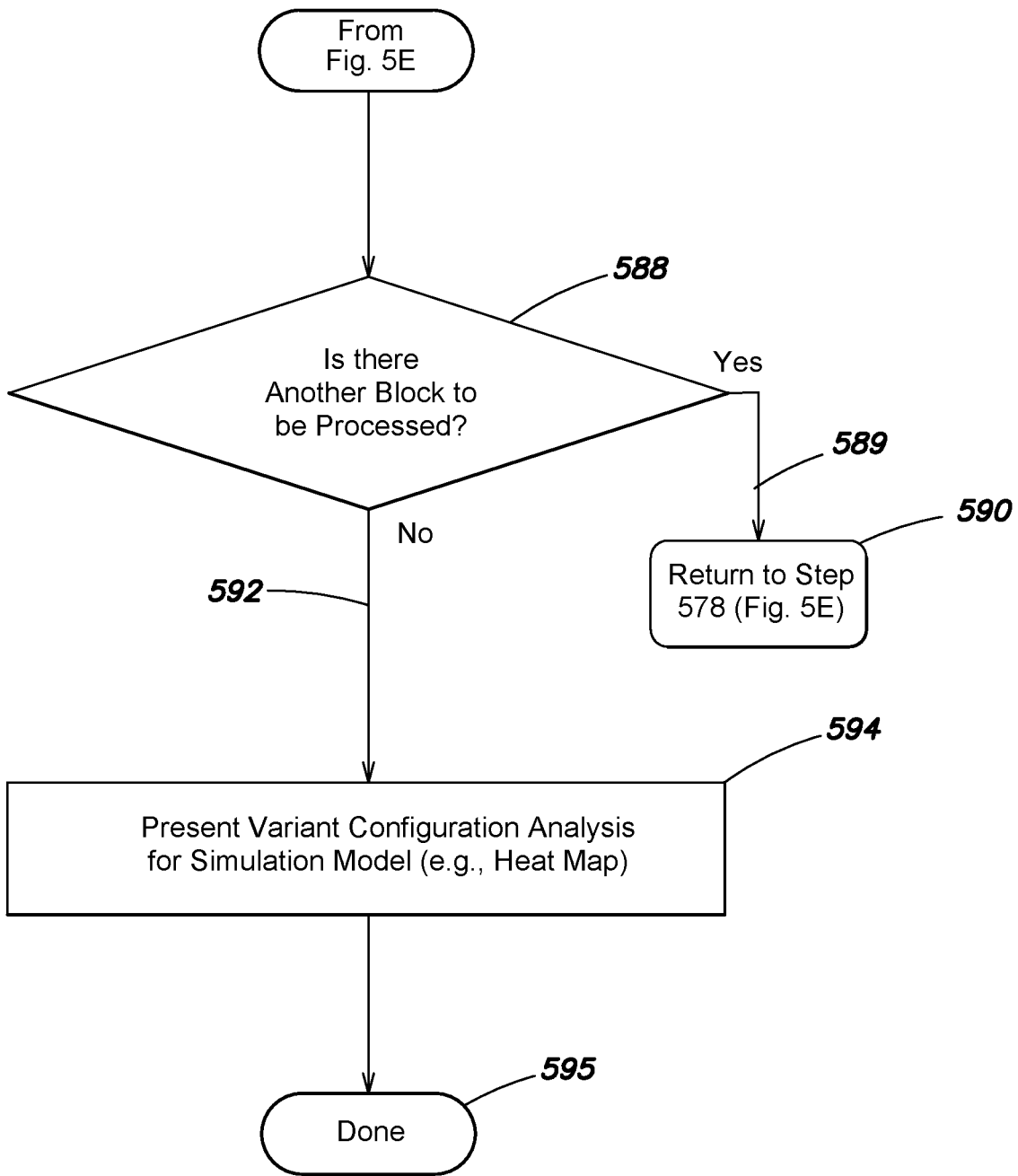

Referring to FIG. 5F of the flow diagrams, following the categorization of the current model element, the activeness status determination engine 404 may determine whether there is another model element on the active list to be categorized, as indicated at decision block 588. As noted, a model element may be a block, and the block can be a variant block or a non-variant block. In addition, a block may be hierarchal or not. If so, processing may return to block 578, as indicated by Yes arrow 589 leading to Go To block 590. In some embodiments, once all of the model elements from the active list have been categorized, the visual tool creator 410 may direct the UI engine 302 to output the results of the variant configuration analysis for the model, e.g., present them on a display of a data processing device, as indicated by No arrow 592 leading to block 594. Processing may then be complete as indicated by Done block 595. In some embodiments, the visualization tool creator 410 may present the results of the analysis in the form of a heatmap a version of which is illustrated in the region 202 of the UI 200.

It should be understood that the visualization tool creator 410 may present the results of the variant configuration analysis for a model in additional and/or alternative ways than the heatmap view presented in FIG. 2. For example, the visualization tool creator 410 may present the results in a graph view, a report view, etc., one or more of which may be superimposed on the model.

Figure 7A:
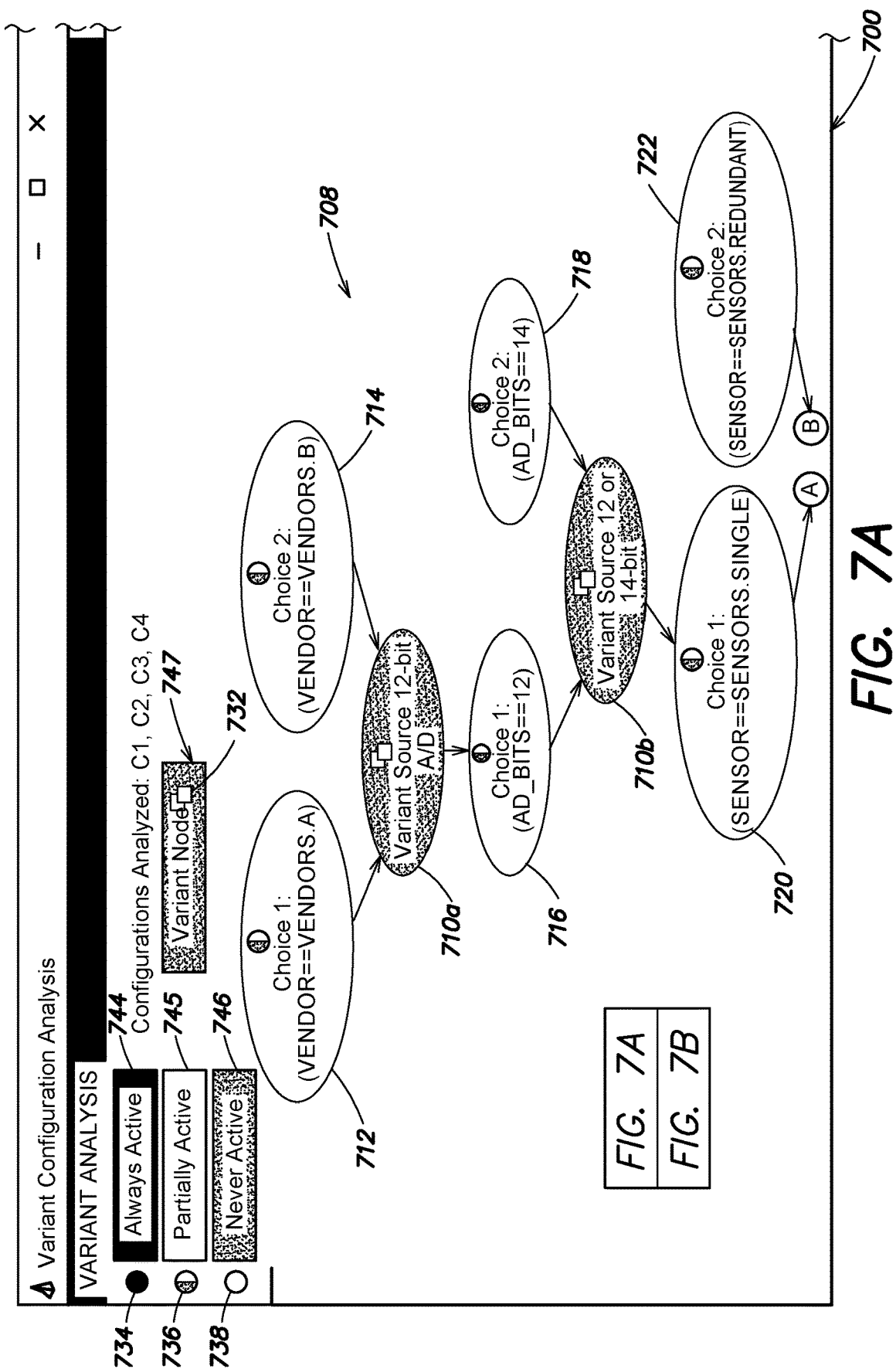
FIGS. 7A and 7B are partial views of an illustration of an example User Interface (UI) presenting results of a variant configuration analysis in the form of a graph in accordance with one or more embodiments.
Figure 7B:
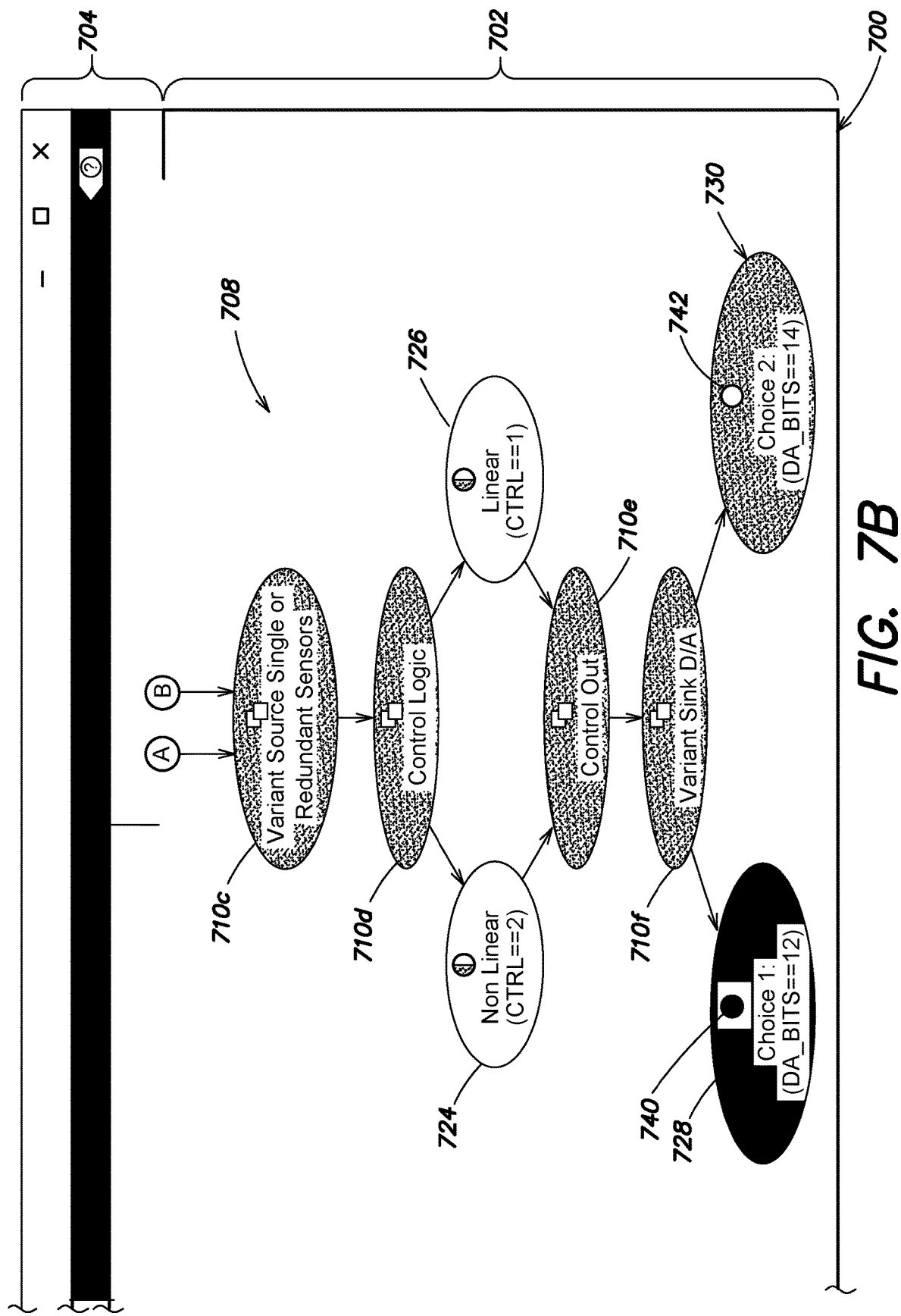

FIGS. 7A and 7B are partial views of an illustration of an example User Interface (UI) 700 presenting results of a variant configuration analysis for the model 100 in the form of a graph in accordance with one or more embodiments. The UI engine 302 may output the UI 700, for example it may present the UI 700 on a display of a workstation. The UI 700 may include a region 702 that presents the results of the analysis and another region 704 for filtering the information presented in the region 702.

The region 702 may present the results of the configuration analysis of the model 100 in the form of a graph 708 having nodes and edges, e.g., arrows. For example, the graph 708 may include a node for each variant block of the model 100, such as nodes 710a-f. Nodes representing a variant source block, such as nodes 710a, 710b and 710c, which represent the variant source blocks 108, 110, and 112, respectively, may have multiple incoming edges representing all of the input choices and a single output edge. Nodes representing a variant sink block, such as node 710f, which represents the variant sink block 128, may have a single incoming edge and multiple outgoing edges representing all of the output choices. In some embodiments, two nodes may be used to represent a variant subsystem block. For example, nodes 710d and 710e may represent variant subsystem block 102. The pair of nodes representing a variant subsystem block may have one or more incoming edges-corresponding to the inputs to the variant subsystem block—and one or more outgoing edges—corresponding to the outputs of the variant subsystem block.

The graph 708 also may include nodes representing the group of non-variant model elements of the model 100 that have the same propagated variant condition. For example, node 712 represents the model element(s) to which the variant condition VENDOR==VENDORS.A was propagated, i.e., model element 104. Node 714 represents the model element(s) to which the variant condition VENDOR==VENDORS.B was propagated, i.e., model element 105. Node 716 represents the model elements to which the variant condition AD_BITS==12 was propagated, i.e., model elements 104, 105, and 114. Node 718 represents the model elements to which the variant condition AD_BITS==14 was propagated, i.e., model elements 106 and 107. Node 720 represents the model element(s) to which the variant condition SENSORS==SENSORS.SINGLE was propagated, i.e., model elements 116, 114, 104, and 105. Node 722 represents the model element(s) to which the variant condition SENSORS==SENSORS.REDUNDANT was propagated, i.e., model elements 118, 106, and 107. Node 724 represents the model element(s) to which the variant condition CTRL==2 was propagated, i.e., model element 122. Node 726 represents the model element(s) to which the variant condition CTRL==1 was propagated, i.e., model element 120. Node 728 represents the model element(s) to which the variant condition DA_BITS==12 was propagated, i.e., model elements 130 and 124. Node 730 represents the model element(s) to which the variant condition DA_BITS==14 was propagated, i.e., model element 126.

The UI engine 302 may apply one or more graphical affordances to the graph 708 to indicate which model elements are always active, which model elements are partially active, and which model elements are never active for the variant configurations that were analyzed. The filter region 704 may explain the graphical affordances used in the graph 708. In some embodiments, the graphical affordances may be color. For example, nodes representing model elements that are always active for all of the analyzed variant configurations may be colored blue, nodes representing model elements that are never active may be colored red, and nodes representing model elements that are partially active may be colored white. In addition to the color coding, badges may be placed on nodes by the UI engine 302. For example, as indicated at entry 732 of the filter region 704, a badge of overlapping squares may indicate a variant model element. As indicated at entry 734, a badge of a fully shaded circle may indicate a node whose model elements are always active. As indicated at entry 736, a badge of a half shaded circle may indicate a node whose model elements are partially active. As indicated at entry 738, a badge of a white or unshaded circle may indicate a node whose model elements are never active. As illustrated, node 728 includes a badge 740 indicating its model elements, i.e., model elements 130 and 124, are always active, while node 730 includes a badge 742 indicating its model elements, i.e., model element 126, are never active. It should be understood that the UI engine 302 may apply or use additional and/or other graphical affordances.

As with the UI 200 (FIG. 2), the UI 700 presents the results of the configuration analysis performed by the variant configuration analysis system 400 in a way that aids in debugging the model 100. For example, if the graph 708 reveals one or more model elements that are never active, then the model 100 may have a design error, and so on.

The filter region 704 also may include user interface elements for filtering the information presented in the graph 708. In some embodiments, the filter region 704 may include command buttons 744-747 for always active, partially active, never active, and variant nodes. In response to selection of one or more of the command buttons 744-747, e.g., by a user, the visual tool creator 410 may filter the nodes of the graph 708 to match the selected command button 744-747.

In some embodiments, one or more nodes of the graph 708 may be linked to the respective model elements of the model 100 that correspond to the node. Accordingly, in response to selection of a node, such as the node 730, e.g., by a user, the UI engine 302 may identify the model elements that correspond to the node, e.g., the node 730. For example, the UI engine 302 may apply a graphical affordance to the respective model elements of the model 100, such as color, shading, bolding, highlighting, etc., as these model elements are displayed on the model in the model editor and/or by the modeling environment.

Figure 8A:
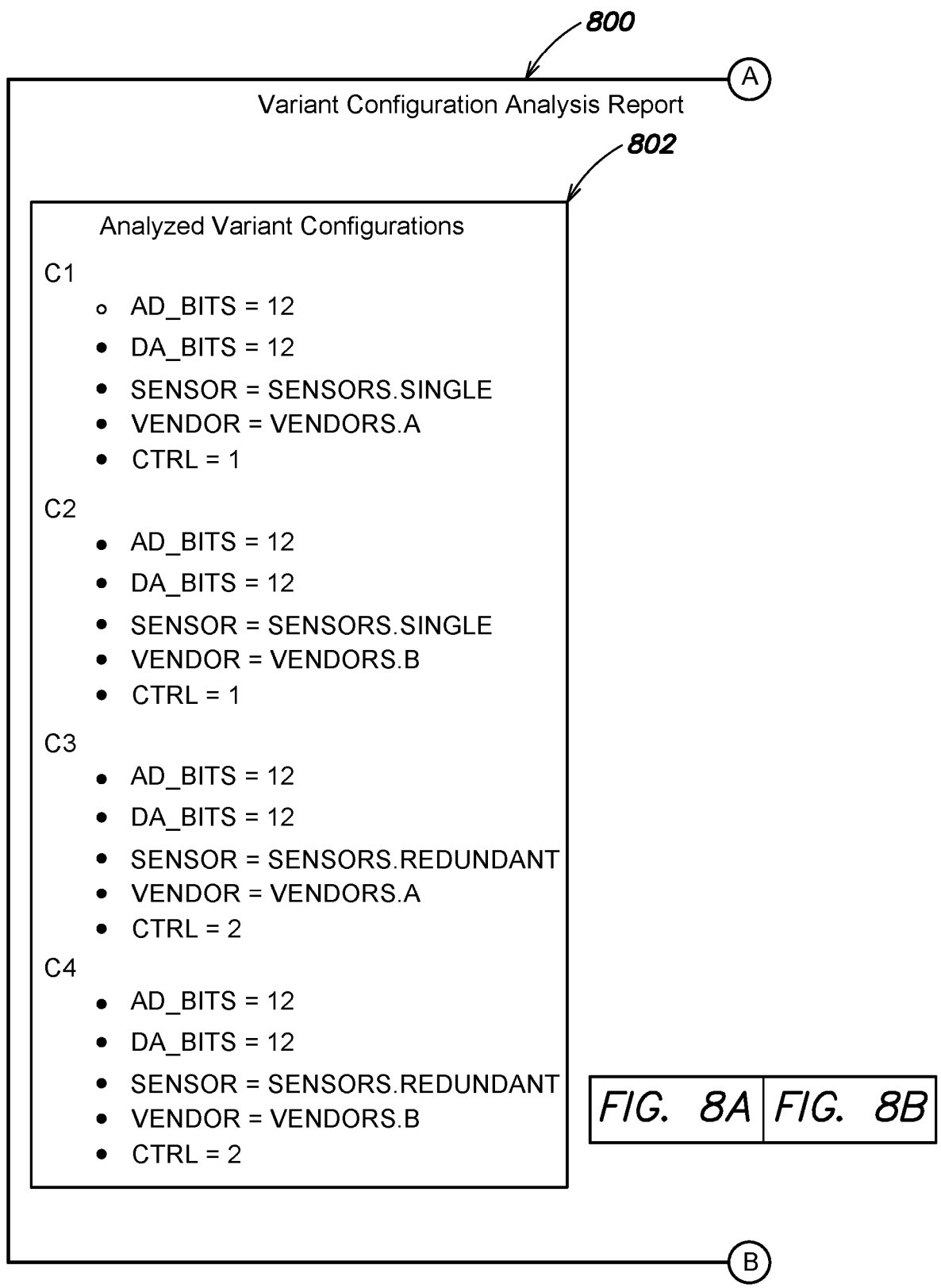

FIGS. 8A and 8B are partial views of an illustration of an example User Interface (UI) 800 presenting results of a variant configuration analysis for the model 100 in the form of a report in accordance with one or more embodiments.

The UI engine 302 may output the UI 800, for example it may present the UI 800 on a display of a workstation. The UI 800 may include a region 802 that provides information on the variant configurations that were analyzed. For example, the region 802 may list the variant conditions associated with the variant configurations. The UI 800 also may include a region 804 that provides a listing of all model elements that are inactive for all variant configurations that were analyzed and all model elements that are active for all of the variant configurations that were analyzed. The UI 800 may further include a region 806 that presents detailed information regarding active and inactive model elements for the analyzed variant configurations. For example, the region 806 may present the block paths of active model elements, the block paths of inactive model elements, variant conditions propagated to model elements, variant parameters, state transitions, requirements, test cases, file dependencies, information about file dependencies used by variant configurations, etc. A block path may uniquely identify a block within a model hierarchy. For example, a block path for a given block may include a unique identifier for the given block, a unique identifiers for the model and unique identifiers for the hierarchical model components, if any, that contain the given block.

In some embodiments, requirements may be specified for a model. The requirements may be linked to model elements included in a model, including model elements that are part of variant choices within the model. The variant configuration analysis system 400 may analyze whether a group of variant configurations satisfy a requirement specified for the model. For example, the variant configuration analysis system 400 may determine whether a model element to which a requirement is linked is active or inactive for the group of variant configurations.

Requirements may be specified using one or more tools, such as the Simulink Requirements tool from The Math Works, Inc. and the IBM Rational DOORS® software product from IBM Corp. of Armonk, NY, among others. Requirements may be documented in requirements files that may be created and/or revised, e.g., by a user. Exemplary file formats of requirements files include text files, Hyper Text Markup Language (HTML) files, spreadsheet files, word processing files, drawing or diagram files, and Portable Document Format (PDF) files, among others.

Figure 9:
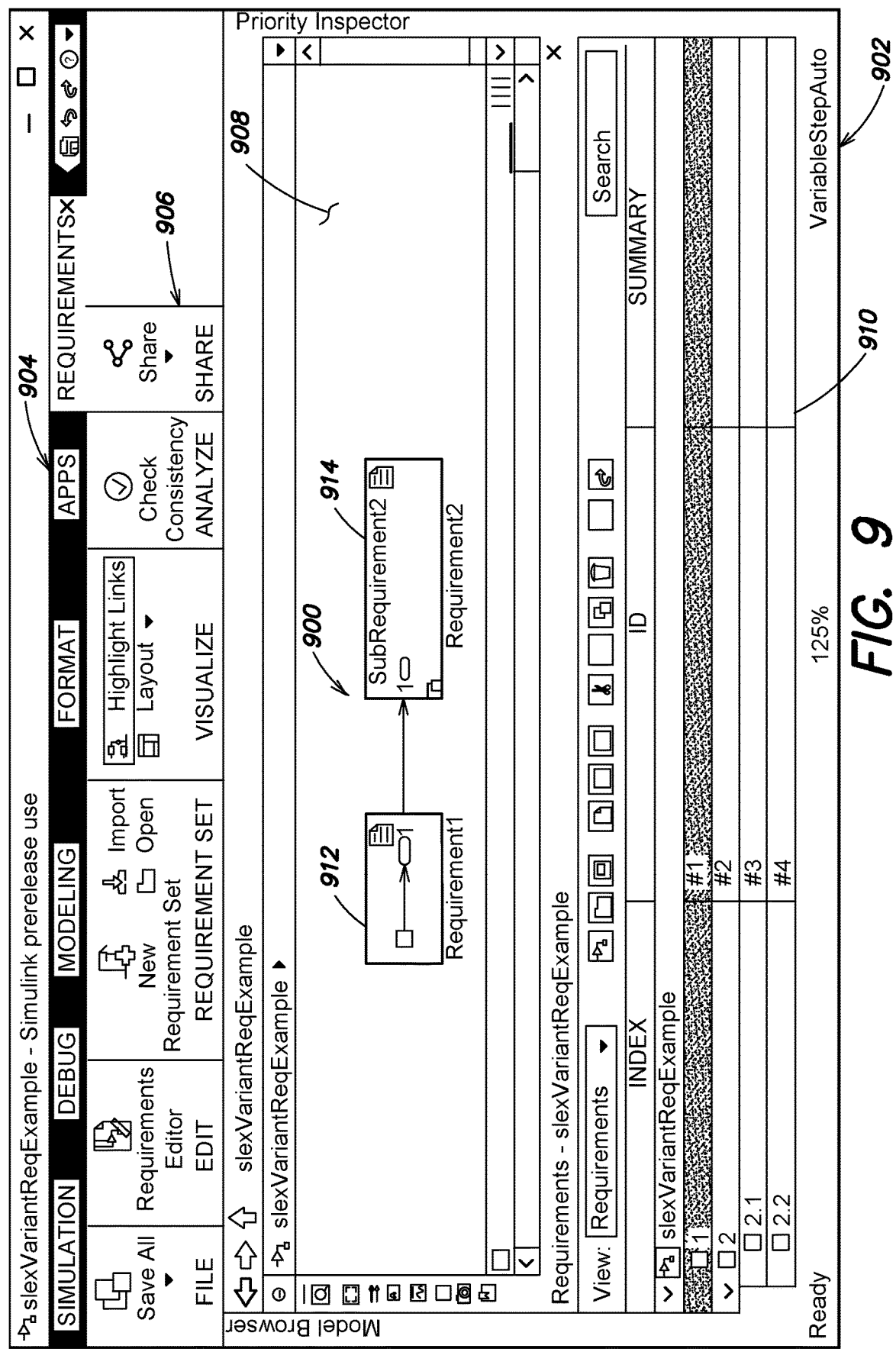
FIG. 9 is an illustration of an example executable simulation model in accordance with one or more embodiments.

FIG. 9 is an illustration of an example executable simulation model 900 in accordance with one or more embodiments. The model 900 may be presented on a model editor window 902. The model editor window 902 may include graphical affordances allowing a user to open, construct, edit, run, and save the model 900. For example, the model editor window 902 may have a plurality of tabs indicated at 904, such as Simulation, Debug, Modeling, Format, Apps, and Requirements (which is the opened tab). Each tab may have a respective toolstrip with command buttons, such a Requirements toolstrip 906. The model editor window 902 also may include a canvas 908 and a visual depiction of the model 900 may be presented on the canvas 908. The model editor 902 also may include a requirements view 910 which provides information on requirements linked to the model 900.

The model 900 may include two subsystems 912 and 914 labeled 'Requirement1' and 'Requirement2'.

Figure 10:
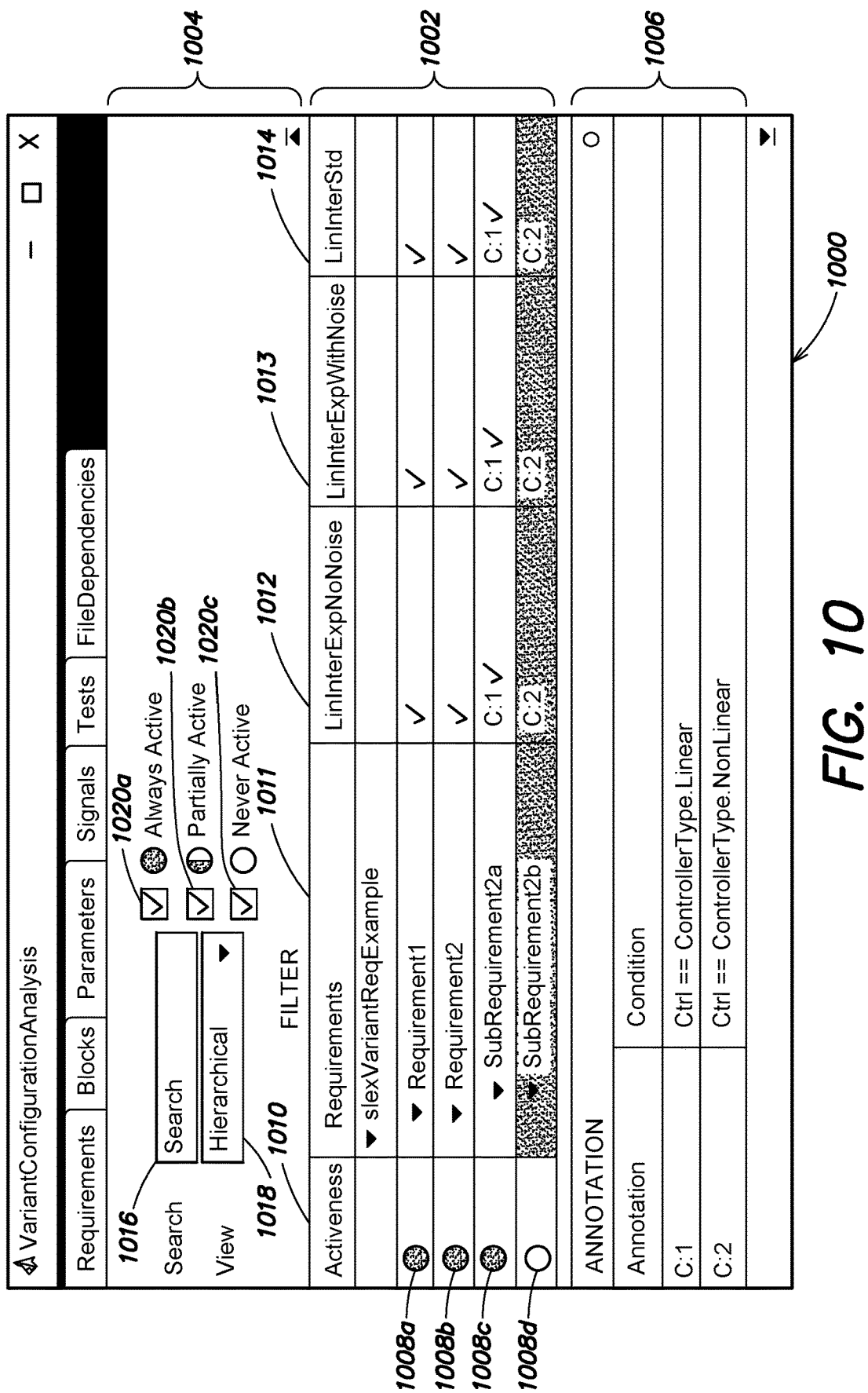
FIG. 10 is an illustration of an example User Interface (UI) presenting results of a requirements analysis in the form of a heat map in accordance with one or more embodiments.

FIG. 10 is an illustration of an example User Interface (UI) 1000 presenting results of a requirements analysis for the simulation model 900 as performed by the variant configuration analysis system 400 in accordance with one or more embodiments. The UI 1000 may include a region 1002 that presents the results of the analysis, another region 1004 for filtering the information presented in the region 1002, and a further region 1006 that maps variant conditions to the annotations, abbreviations, or symbols used in the region 1002.

The region 1002 may present the results of the configuration analysis of the model 900 in the form of a heat map having rows and columns that define cells presenting information. For example, the heat map may include a plurality of rows 1008*a-d* where each row corresponds to a particular requirement of the model 900 and a plurality of columns 1010-1014 for presenting the results of the requirements analysis for a group of variant configurations defined for the model. The column 1010 labeled 'Activeness' may present a graphical affordance indicating whether the respective requirement is never active, always active, or partially active for the analyzed variant configurations. The column 1011 labeled 'Requirements' may identify the requirements defined for the model 900, e.g., by name. Graphical affordances, such as triangles, may be included in rows for requirements associated with hierarchical model elements. In response to selection of the triangles, rows for the requirements contained in a hierarchical model element may be added or removed from the region 1002. The columns 1012-1014 labeled 'LinInterExpNoNoise', 'LinInterExpWithNoice, and 'LinInterStd' represent the variant configurations for which the model 900 was analyzed and include the results of the requirements analysis.

In some embodiments, graphical affordances may be presented in the cells defined by the rows 1008 and the columns 1012-1014 to indicate whether the model elements linked to a requirement are active for the respective variant configuration. For example, a checkmark may be used to indicate that the model element(s) linked to a requirement is active for the variant configuration. In addition, different colors or grayscale shading may be used in the rows 1008 to indicate whether the model element(s) linked to a requirement are always active, never active, or partially active for the analyzed variant configurations. Rows with no shading, such as rows 1008*a-c*, indicate that the model elements linked to the respective requirements, e.g., requirement 'SubRequirement2a' of row 1008*c*, are always active for all of the variant configurations that were analyzed. As noted, requirements may be linked to one or more model elements of a model using a requirements tool. Rows with shading, such as row 1008*d*, indicate that the model element(s) linked to the respective requirements, e.g., 'SubRequirement2b', are never active for any of the analyzed variant configurations. While not illustrated in FIG. 10, a row with some shading would indicate that the model element(s) linked to the respective requirement is active for at least one of the variant configurations, but not for all of the variant configurations of the group.

The region 1004 may include user interface elements for filtering the information presented in the region 1002. In some embodiments, the region 1004 may include a search field 1016, a drop down menu 1018 and checkboxes 1020*a-c*. In response to a user entering a model element name in the search field 1016, only rows 1008 of the requirements linked to that model element, if any, may be presented in the region 1002. As described, the search field 1016 may support regular expression matching. The drop down menu 1018 may present options for choosing how requirements associated with a model are presented in the region 1002. The options may include all requirements or hierarchical requirements. When the view is set to hierarchical, requirements associated with hierarchical blocks will be shown, e.g., in a hierarchical (tree-like) view that may correspond to the model's hierarchy. When the view is set to "all requirements", requirements from non-hierarchical blocks may be shown as well as requirements associated with hierarchical blocks. The checkboxes 1020*a-c* may be selected/deselected to present requirements whose linked model elements are determined to be always active, partially, or never active, respectively.

It should be understood that the visualization tool creator 410 may present the results of a requirements analysis in other ways. For example, the visualization tool creator 410 may present the results in the form of a graph, a report, etc.

Requirements for model capabilities may be linked with blocks. If requirements are provided, the results of the requirements analysis will have the requirements added to them. For example, if requirements are identified by a key such as R1, R2, R3, etc., the visualization tool creator 410 may present in the results the requirements listed. For example, if a block has requirement, R1, and the variant configuration analysis indicates this block is always inactive, then the requirement is not met for the selected variant configurations that were provided to the variant analysis system.

Figure 13:
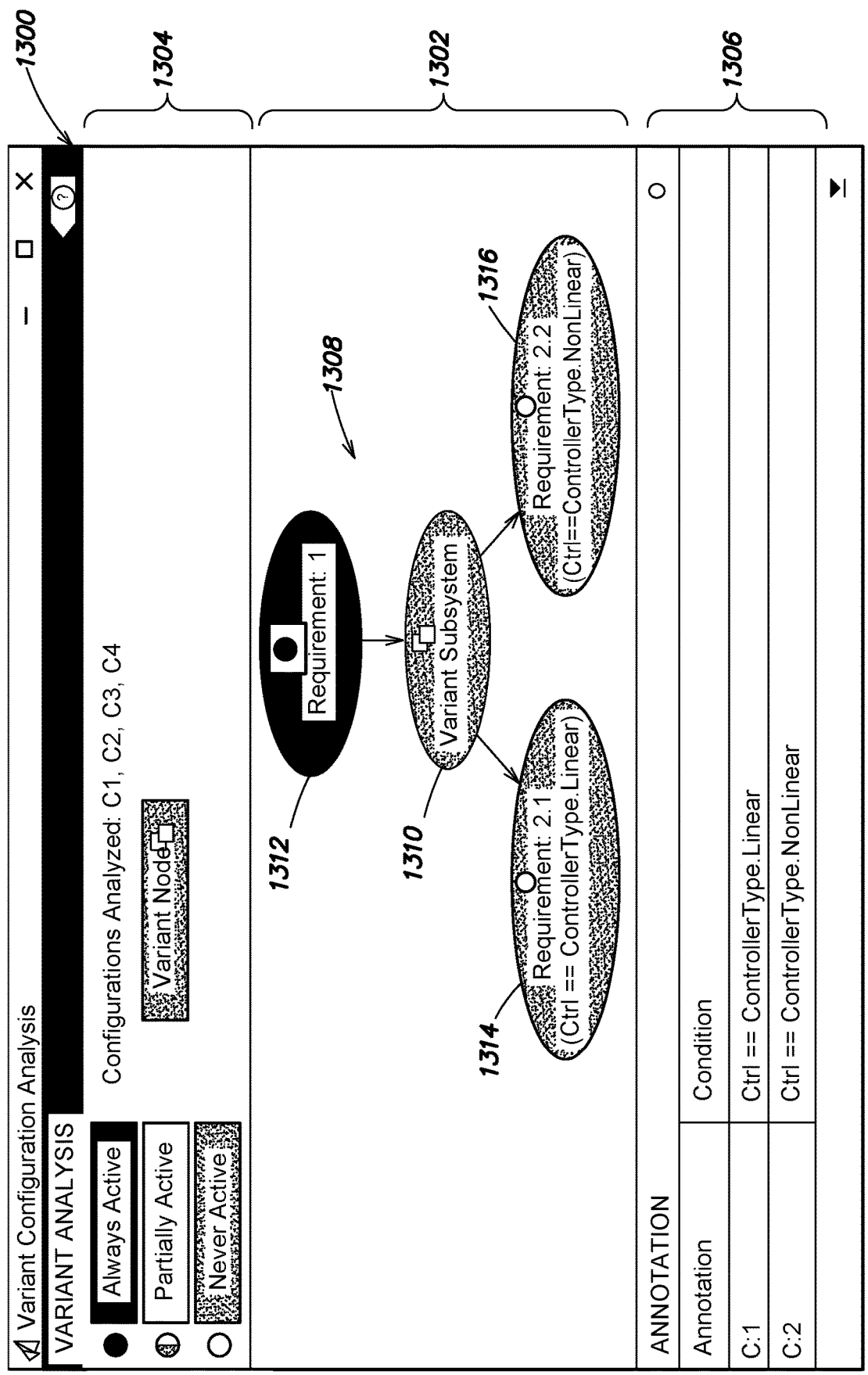
FIG. 13 is an illustration of an example User Interface (UI) presenting results of a requirements analysis in the form of a graph in accordance with one or more embodiments.

FIG. 13 is an illustration of an example User Interface (UI) 1300 presenting results of a variant configuration analysis for the model 900 in the form of a graph in accordance with one or more embodiments. The UI engine 302 may output the UI 1300, for example it may present the UI 1300 on a display of a workstation. The UI 1300 may include a region 1302 that presents the results of the variant configuration analysis, another region 1304 for filtering the information presented in the region 1302, and a further region 1306 that maps variant conditions to the annotations, abbreviations, or symbols used in the region 1302.

The region 1302 may present the results of the configuration analysis of the model 900 in the form of a graph 1308 having nodes and edges, e.g., arrows. For example, the graph 1308 may include a node for each variant block of the model 900, such as node 1310 which represents the variant subsystem block 914.

The graph 1308 also may include nodes representing the requirements that have the same propagated variant condition. For example, node 1312 represents the requirement '1' to which the variant condition is true, i.e., node 1312 is always active. Node 1314 represents the requirement '2.1' to which the variant condition Ctrl=ControllerTypeLinear was propagated. Node 1316 represents the requirement '2.2' to which the variant condition Ctrl=ControllerTypeNonLinear was propagated.

In some embodiments, the UI engine 302 may apply graphical affordances, such as colors and badges, e.g., icons, to the nodes, which represent requirements, to indicate whether a requirement represented by a node is active in all analyzed variant configurations or inactive in all analyzed variant configurations. If a requirement is inactive in all of the analyzed variant configurations, this might indicate an incorrect or incomplete simulation model. For example, in FIG. 13, nodes 1314 and 1316 are not active in any of the analyzed variant configurations.

If a requirement is active in all of the analyzed variant configurations, this might indicate that the requirement should be linked to model element(s) of a non-variant region of the model. If the requirement is nevertheless associated with a variant region of the model, then this can again indicate a modeling error.

Figure 11A:
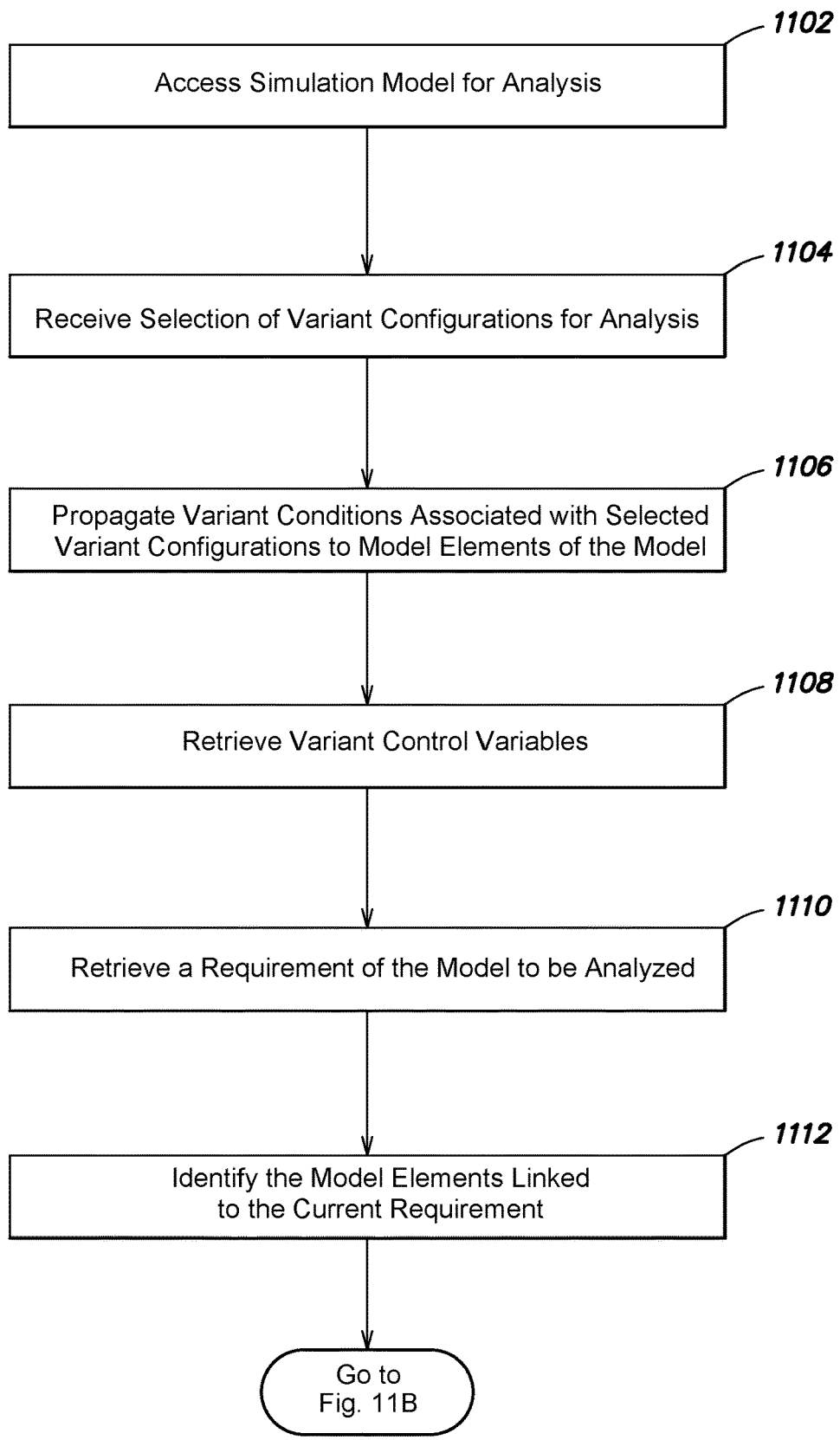
FIGS. 11A-E are partial views of a flow diagram an example method for performing requirements analysis for variant configurations in accordance with one or more embodiments.
Figure 11B:
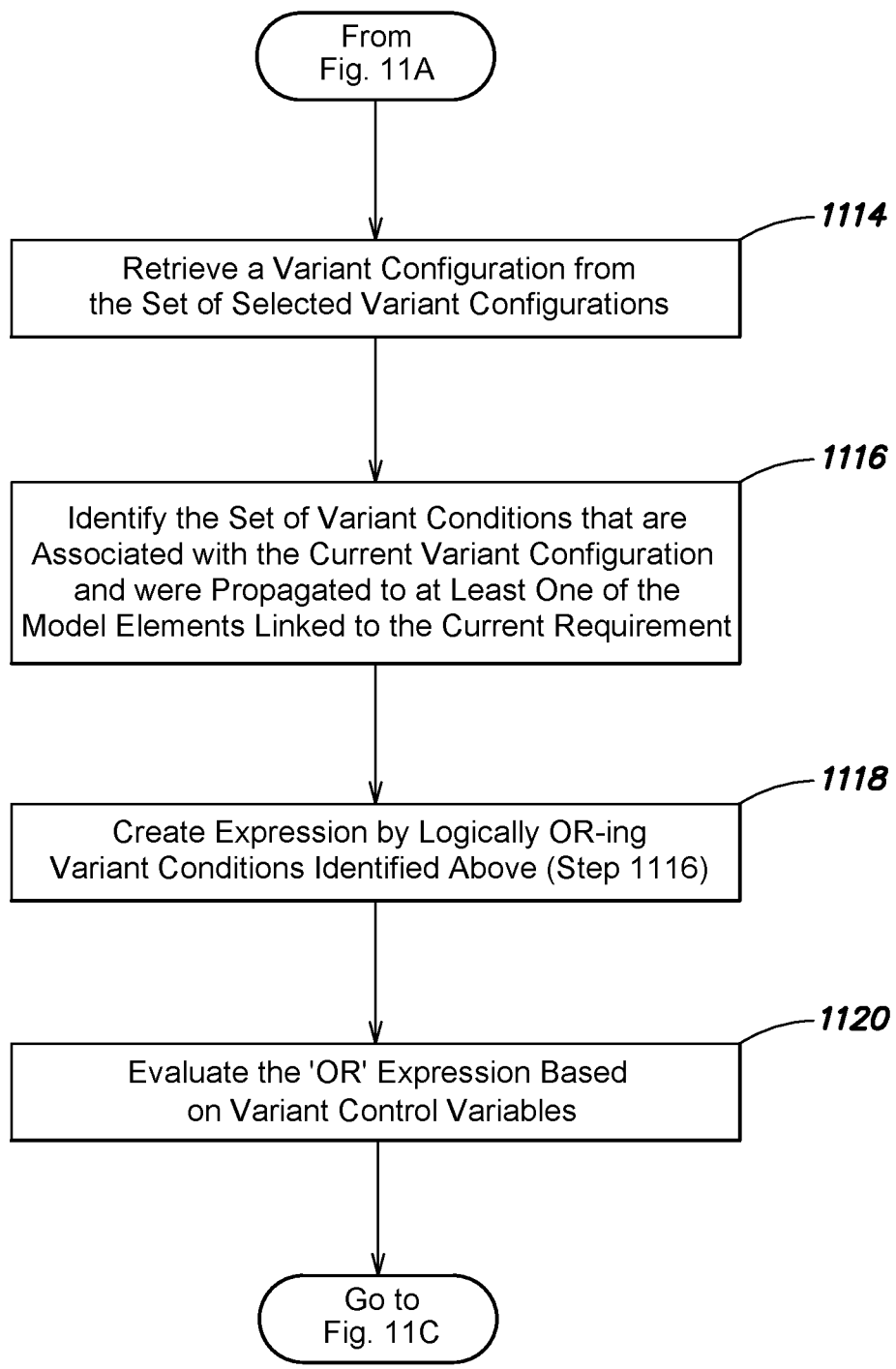

FIGS. 11A-E are partial views of a flow diagram an example method for performing requirements analysis for variant configurations in accordance with one or more embodiments. The variant configuration analysis system 400 may access an executable simulation model to be analyzed, as indicated at block 1102. The model may include one or more variant model elements that establish variant choices in the model. In addition, one or more requirements may be associated with the model. The requirements may be behavioral requirements that a model must satisfy, architectural requirements, performance requirements, safety requirements, mission critical requirements, user experience requirements, etc. The variant configuration analysis system 400 may receive a selection of a group of variant configurations defined for the model that are to be analyzed, as indicated at block 1104. The variant implementation system 314 may propagate the variant conditions associated with the one or more variant configurations of the group to model elements of the model, as indicated at block 1106. The requirements analysis engine 406 may retrieve variant control variables defined for the model, as indicated at block 1108. The requirements analysis engine 406 may retrieve one of the requirements defined for the model, as indicated at block 1110. The requirements analysis engine 406 may identify the model elements of the model that are linked to the current requirement, as indicated at block 1112. The requirements analysis engine 406 may retrieve a variant configuration of the group of variant configurations to be analyzed, as indicated at block 1114 (FIG. 11B). The requirements analysis engine 406 may identify the set of variant conditions associated with the current variant configuration that were propagated to at least one model element linked to the current requirement being analyzed, as indicated at block 1116.

Figure 11C:
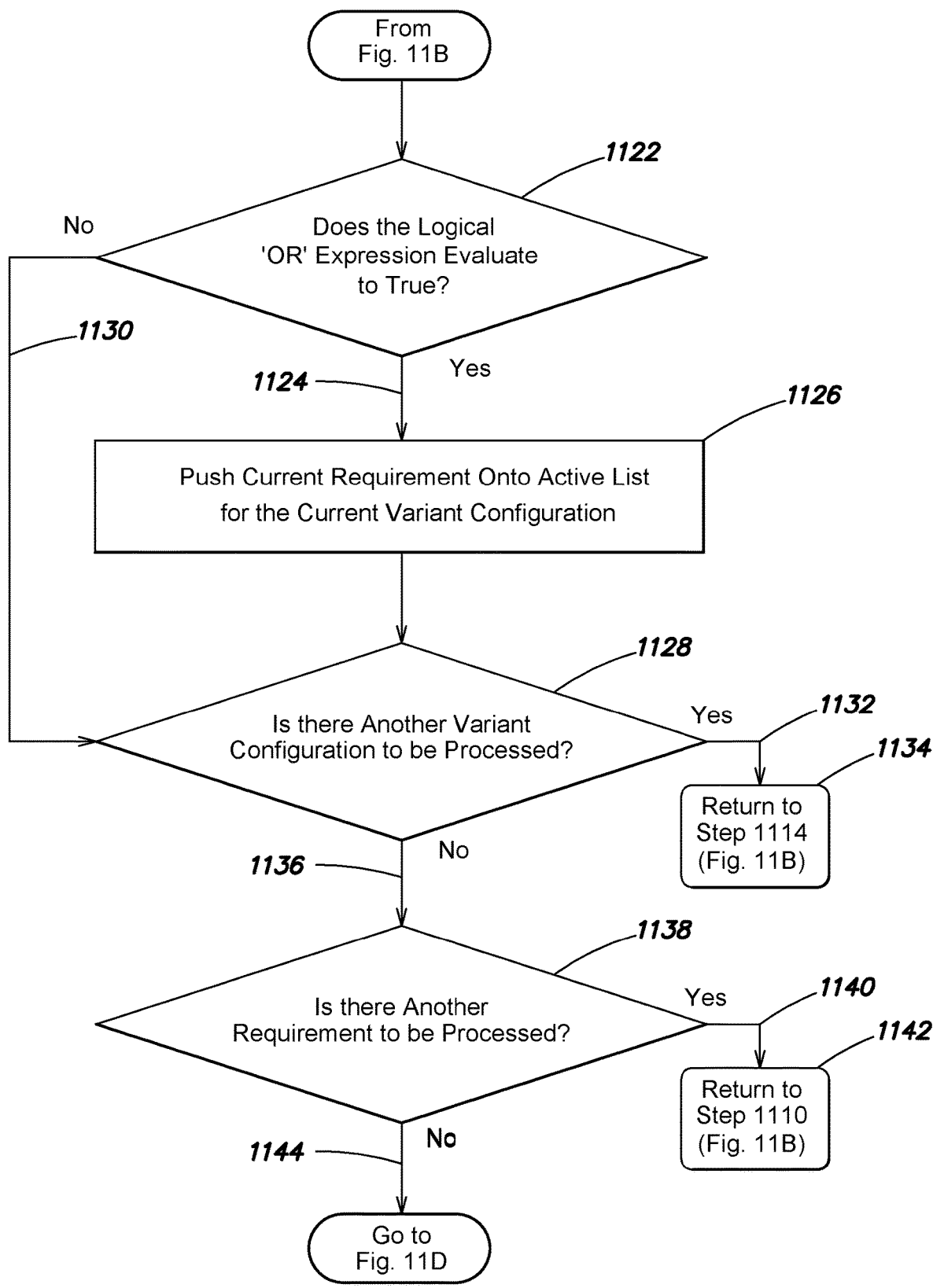
Figure 11D:
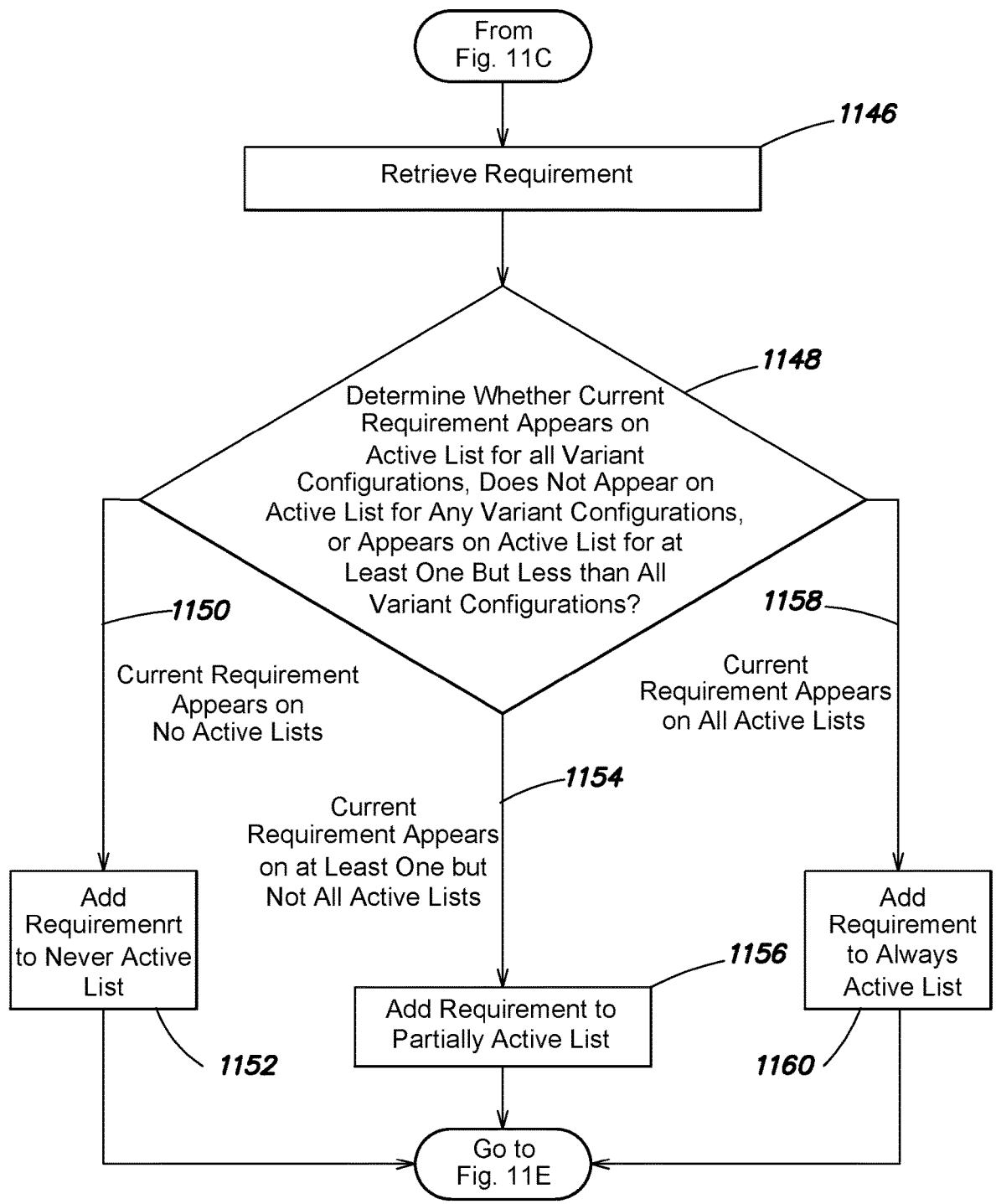

The requirements analysis engine 406 may create an expression that is a logical OR of the variant conditions identified at block 1116, as indicated at block 1118. The requirements analysis engine 406 may evaluate this OR expression based on the values of the variant control variables, as indicated at block 1120. The requirements analysis engine 406 may determine if the logical OR expression evaluates to true, as indicated at decision block 1122 (FIG. 11C). Specifically, the requirements analysis engine 406 may determine whether at least one the variant conditions associated with the variant configuration being analyzed evaluates to true. If so, the requirements analysis engine 406 may push the current requirement onto an active list for the current variant configuration being analyzed, as indicated by Yes arrow 1124 leading to block 1126.

The requirements analysis engine 406 may determine whether there is another variant configuration to be analyzed, as indicated at decision block 1128. Also, if the logical OR expression evaluated at block 1122 did not return true, processing continues at decision block 1128, as indicated by No arrow 1130. If there is another variant configuration to be analyzed, then processing may return to block 1114 (FIG. 11B) at which point a next variant configuration may be retrieved for processing as indicated by Yes arrow 1132 leading to Go To block 1134. The process of retrieving a variant configuration, creating an expression that is a logical OR of the variant conditions associated with the variant configuration, evaluating that expression and optionally pushing the current requirement onto an active list may be repeated for all of the variant configurations identified for analysis. Once all of the variant configurations selected for analysis have been processed, the requirements analysis engine 406 may determine if there is another requirement to be processed, as indicated by No arrow 1136 leading to decision block 1138. If so, processing may return to block 1110 (FIG. 11B) where the requirements analysis engine 406 may retrieve a next requirement for processing, as indicated by Yes arrow 1140 leading to Go To block 1142. The evaluation of all of the variant configurations for all of the requirements may be repeated until all of the requirements have been processed.

Once all of the requirements have been analyzed, the requirements analysis engine 406 may begin analyzing the requirements, as indicated by No arrow 1144 leading to block 1146 (FIG. 11C). Specifically, the requirements analysis engine 406 may retrieve a requirement linked to a model element to which a variant condition associated with one of the variant configurations was propagated. The requirements analysis engine 406 may determine whether the current requirement is active for all of the variant configurations being analyzed, is active for none of the variant configurations being analyzed, or is active for at least one but not all of the variant configurations being analyzed based on an evaluation of the active list, as indicated by decision block 1148. If the current requirement being processed does not appear on the active list for any of the variant configurations, the requirements analysis engine 406 may add the requirement to a never active list, as indicated by arrow 1150 leading to block 1152. If the current requirement being processed appears on the active list for at least one variant configuration but not all of the variant configurations, then the requirements analysis engine 406 may add the requirement to a partially active list, as indicted by arrow 1154 leading to block 1156. If the current requirement being processed appears on the active list for all of the variant configurations being analyzed, then the requirements analysis engine 406 may add the requirement to an always active list, as indicted by arrow 1158 leading to block 1160.

Figure 12:
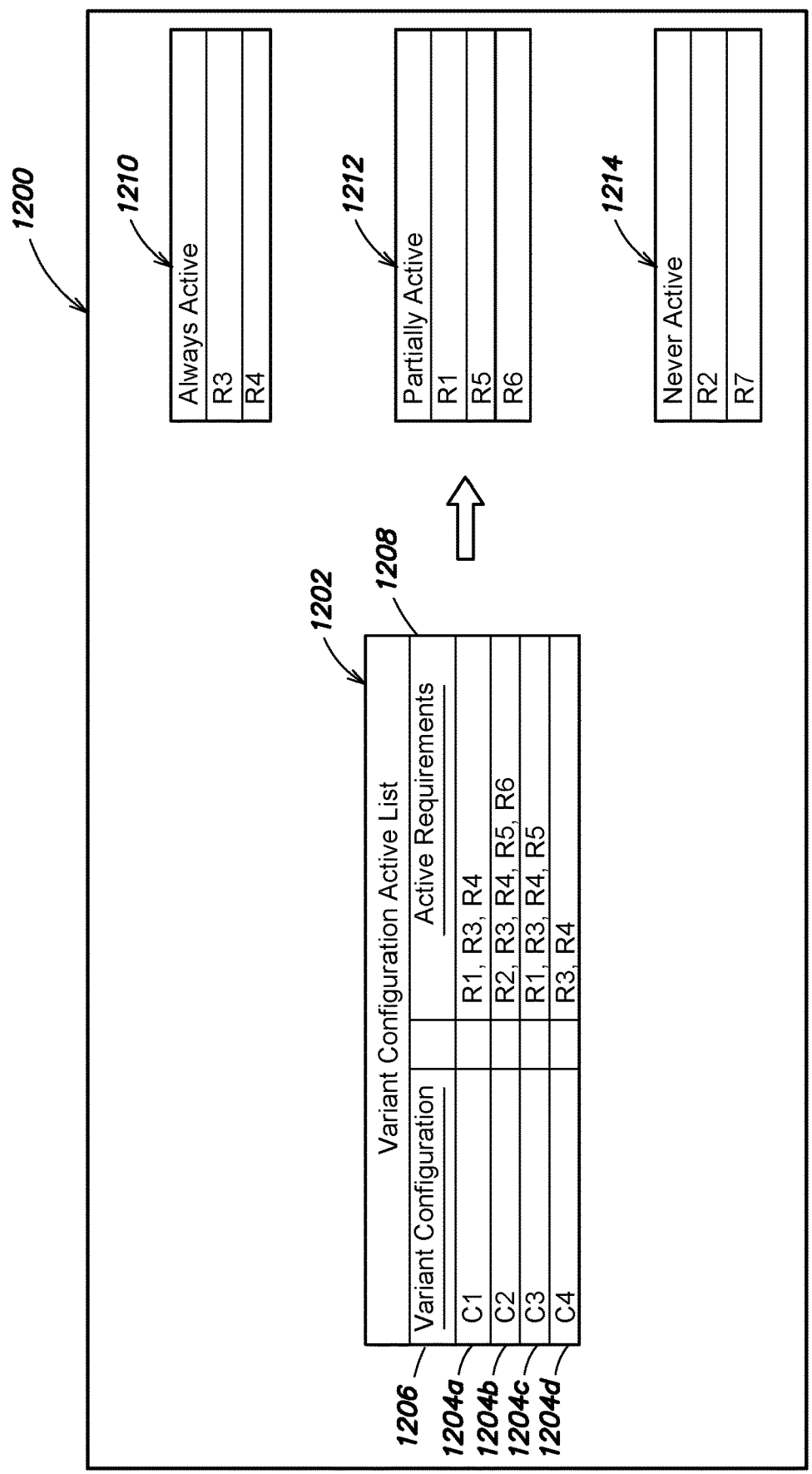
FIG. 12 is a schematic illustration of example data structures for recording the activeness of requirements for variant configurations in accordance with one or more embodiments.

FIG. 12 is a schematic illustration 1200 of example data structures for recording the activeness of requirements for variant configurations in accordance with one or more embodiments. Suppose there are four variant configurations identified or labeled as C1 to C4 and seven requirements identified or labeled as R1 to R7 for a model. The illustration 1200 includes a requirements active list 1202. The requirements active list 1202 may be arranged as a table having rows and columns defining cells for storing information. For example, the list 1202 may include rows 1204*a-d* and columns 1206 and 1208. The rows 1204*a-d* correspond to the variant configurations C1-C4. Column 1206 identifies the variant configuration, e.g., by identifier or label, and column 1208 identifies the requirements active for the respective variant configuration, e.g., by identifier or label.

The requirements analysis engine 406 may analyze the active list 1202 for each of the requirements R1 to R7. The requirements analysis engine 406 may determine that requirements R3 and R4 are listed as active for all variant configuration, e.g., C1 to C4. Accordingly, the requirements analysis engine 406 may add requirements R3 and R4 to an always active list 1210. The requirements analysis engine 406 may determine that requirements R1, R5, and R6 are active for at least one but not all of the variant configurations. Accordingly, the requirements analysis engine 406 may add requirements R1, R5, and R6 to a partially active list 1212. The requirements analysis engine 406 may determine that requirements R2 and R7 are not listed as being active for any of the variant configurations. Accordingly, the requirements analysis engine 406 may add requirements R2 and R7 to a never active list 1214.

Figure 11E:
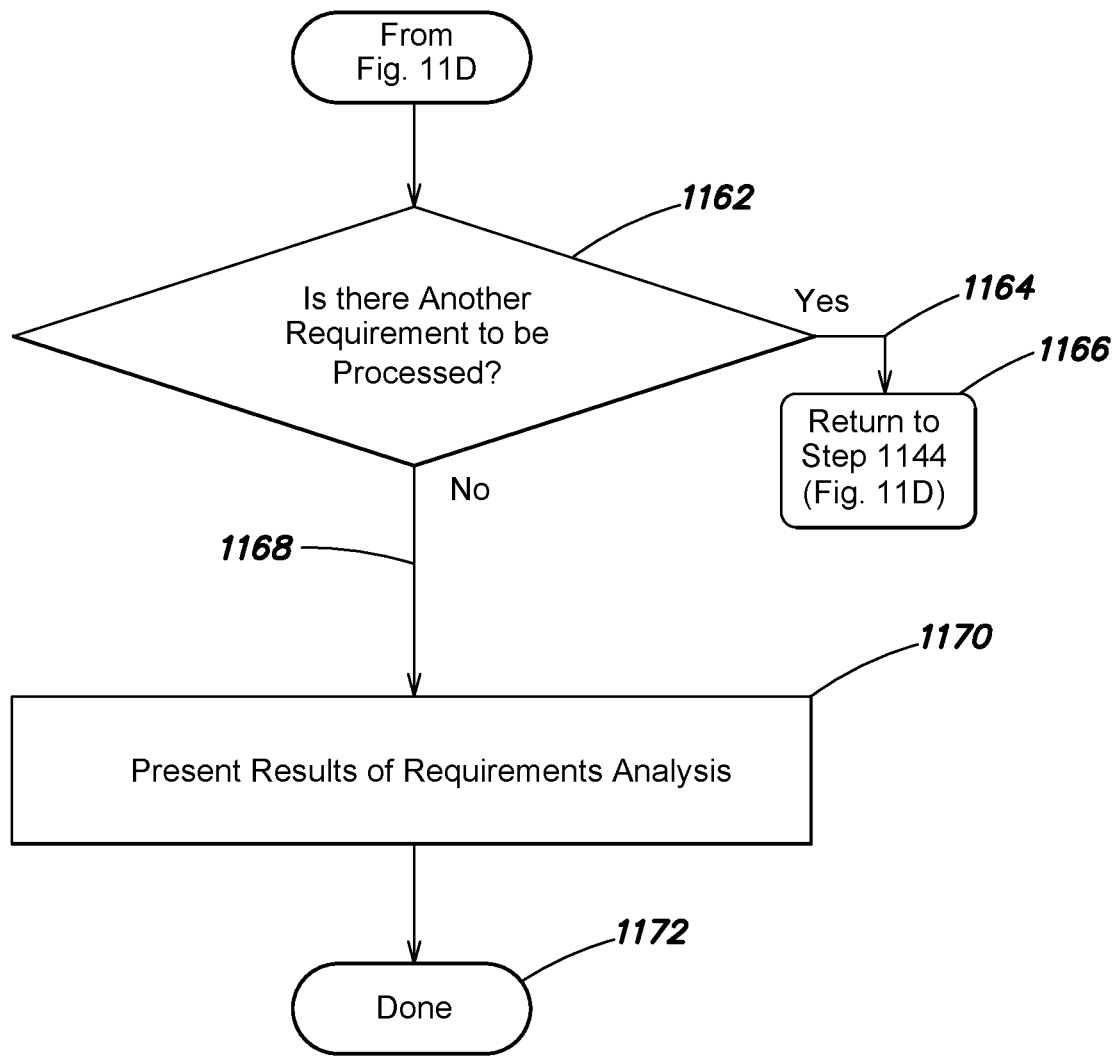

Referring to FIG. 11E of the flow diagrams, following the categorization of the current requirement, the requirements analysis engine 406 may determine whether there is another requirement to be categorized, as indicated at decision block 1162. If so, processing may return to block 1144, as indicated by Yes arrow 1164 leading to Go To block 1166. In some embodiments, once all of the requirements have been categorized, the visual tool creator 410 may direct the UI engine 302 to present the results of the requirements analysis for the model, as indicated by No arrow 1168 leading to block 1170. Processing may then be complete as indicated by Done block 1172.

In some embodiments, the variant configuration analysis system 400 may determine a bill of materials for one or more variant configurations defined for a simulation model. A bill of materials may include a list of the electronic files needed to run a version of the model and/or to produce a deployed system from a particular configuration of a simulation model. The bill of materials lets the user know what is needed to realize the model. For example, if building a car or a component for a car, such as a controller component, a communication component, etc., for a selection of the variant configurations, then the bill of materials defines what is required in order to build the car or the component.

Figure 14A:
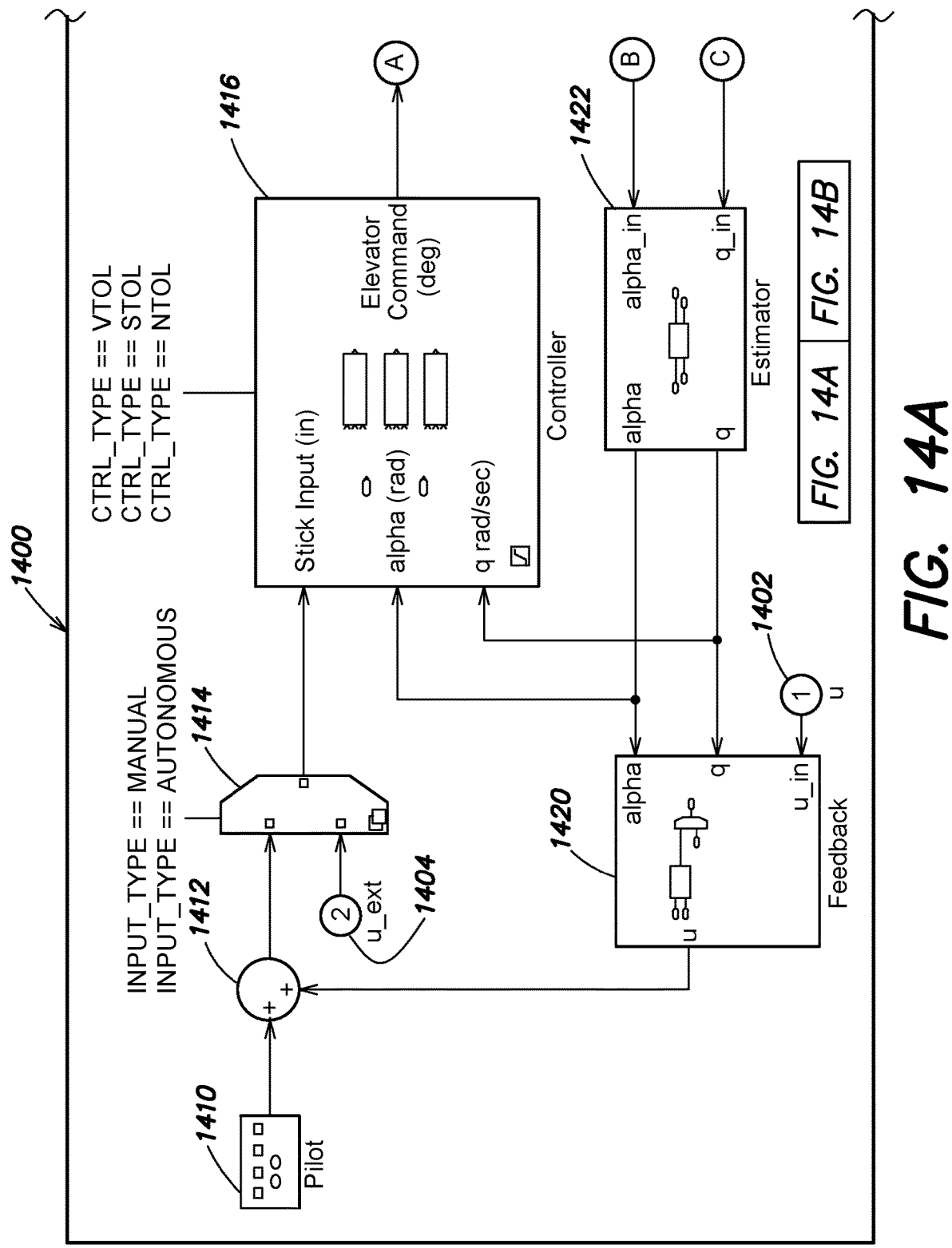
FIGS. 14A and 14B are partial views of an illustration of an example executable simulation model in accordance with one or more embodiments.
Figure 14B:
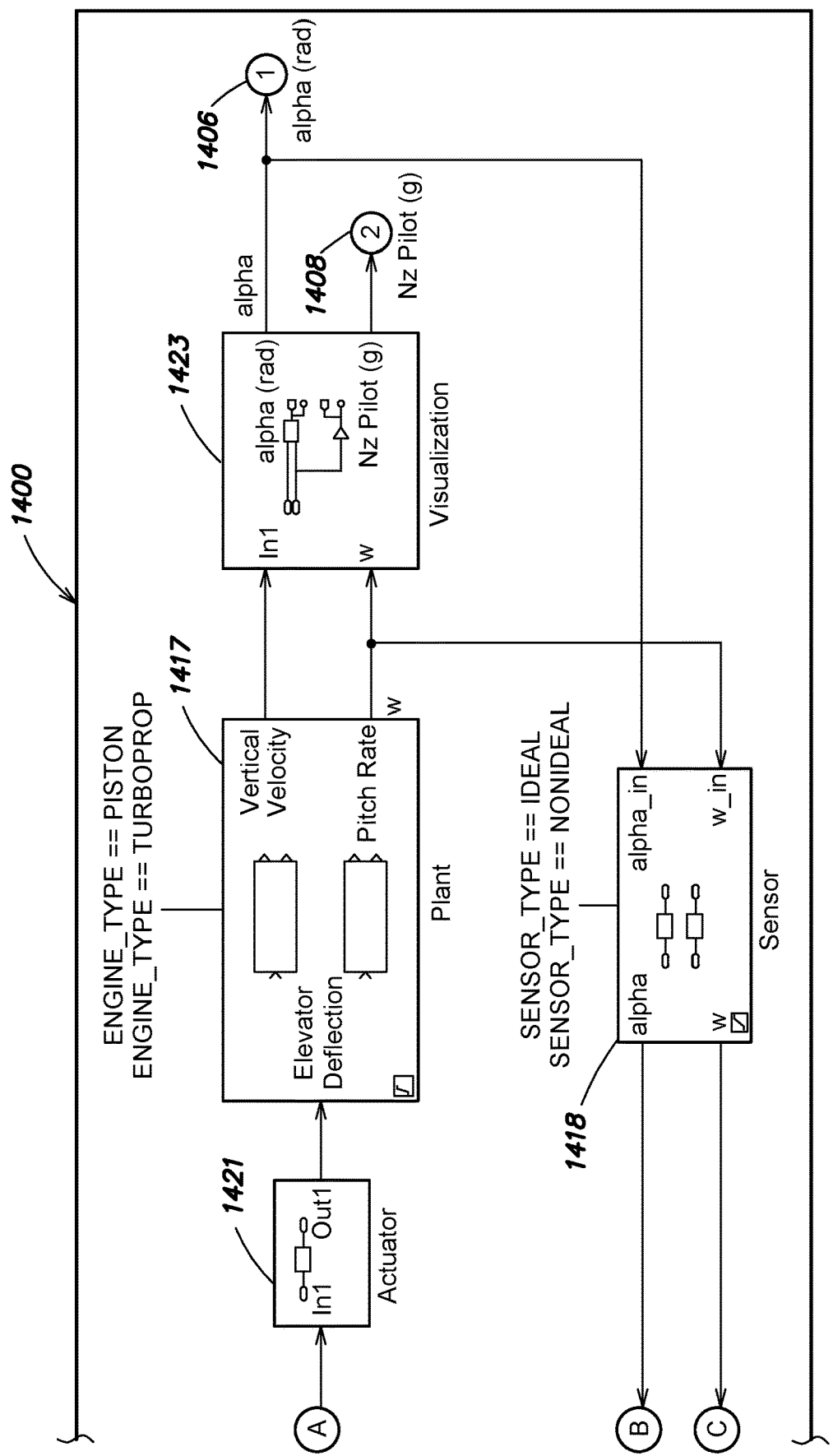

FIGS. 14A and 14B are partial views of an illustration of an example executable simulation model 1400 for an aircraft in accordance with one or more embodiments. The simulation model 1400 may include two Inport blocks 1402 and 1404 labeled 'u' and 'u_ext' and two Outport blocks 1406 and 1408 labeled 'alpha (rad)' and 'Nz Pilot (g)'. The model 1400 may further include a Signal Generator block 1410 labeled 'Pilot', a Sum block 1412, a Variant Source block 1414, three Variant Subsystem blocks 1416-1418 labeled 'Controller', 'Plant', and 'Sensor', respectively, and four Subsystem blocks 1420-1423 labeled 'Feedback', 'Actuator', 'Estimator', and 'Visualization', respectively.

The Controller variant subsystem 1416 may be associated with a variant condition named 'CTRL-TYPE', which may have three values to implement three alternative controllers: a 'VTOL' value to implement a Vertical Take-off and Landing (VTOL) controller, a 'STOL' value to implement a Short Take-off and Landing (STOL) controller, and a 'NTOL' value to implement a Normal Take-off and Landing (NTOL) controller. The Plant variant subsystem 1417 may be associated with a variant condition named 'ENGINE_TYPE', which may have two values to implement two alternative engines: a 'PISTON' value to implement a piston engine and a 'TURBOPROP' value to implement a turboprop engine. The Sensor variant subsystem 1418 may be associated with a variant condition named 'SENSOR_TYPE', which may have two values to implement two alternative sensors: an 'IDEAL' value to implement an ideal sensor having no noise and a 'NONIDEAL' value to implement a non-ideal sensor that includes noise. The Variant Source block 1414 may be associated with a variant condition named 'INPUT_TYPE', which may have two values to implement two alternative inputs to the Controller variant subsystem 1416: a 'MANUAL' value to implement a completely manual mode and an 'AUTONOMOUS' value to implement a semi-autonomous mode in which pilot stick input is combined with a feedback signal computed by the Sensor variant subsystem 1418.

The one model 1400 can be used to support multiple customers each having different requests. For example, one company, Company A, may request a NTOL controller for a piston engine. Another company, Company B, may request both STOL and VTOL controllers for both piston and turboprop engines. Yet another company, Company C, may request both STOL and VTOL controllers for a turboprop engine.

A user may define different variant configurations to support the requests of the three companies. For example, the following table lists variant configurations that may be defined for the model 1400.

TABLE II

| Variant Configuration | Variant Control Variables |
| --- | --- |
| C1 | CTRL_TYPE=NTOL, ENGINE_TYPE=PISTON, INPUT_TYPE=MANUAL, SENSOR_TYPE=IDEAL |
| C2 | CTRL_TYPE=STOL, ENGINE_TYPE=PISTON, INPUT_TYPE=MANUAL, SENSOR_TYPE=IDEAL |
| C3 | CTRL_TYPE=VTOL, ENGINE_TYPE=PISTON, INPUT_TYPE=MANUAL, SENSOR_TYPE=IDEAL |
| C4 | CTRL_TYPE=STOL, ENGINE_TYPE=TURBOPROP, INPUT_TYPE=MANUAL, SENSOR_TYPE=IDEAL |
| C5 | CTRL_TYPE=VTOL, ENGINE_TYPE=TURBOPROP, INPUT_TYPE=MANUAL, SENSOR_TYPE=IDEAL |

Variant configuration C1 supports the request of Company A, variant configurations C2-C5 support the requests of Company B, and variant configurations C4 and C5 support the requests of Company C.

In some embodiments, the bill of materials builder 408 may determine which model elements are active for one or more selected variant configurations defined for a model. The bill of materials builder 408 may determine which model files include the active model elements for the variant configurations. The bill of materials builder 408 may generate a list of files needed to implement the active model elements for the variant configurations.

The visualization tool creator 410 may create a report that identifies the files required by different variant configurations defined for a model. For example, a Simulink model may include one or more .mdl or .slx files, which may be model files, one or more .m files, which may be MATLAB script or function files, one or more .mat files, which may contain MATLAB formatted data, one or more .sldd, which may be a data dictionary containing model data, one or more .c files, which may be used by S-function blocks, and one or more subsystem and/or model reference files, such as .slx files used by a subsystem and/or model reference block.

Figure 15:
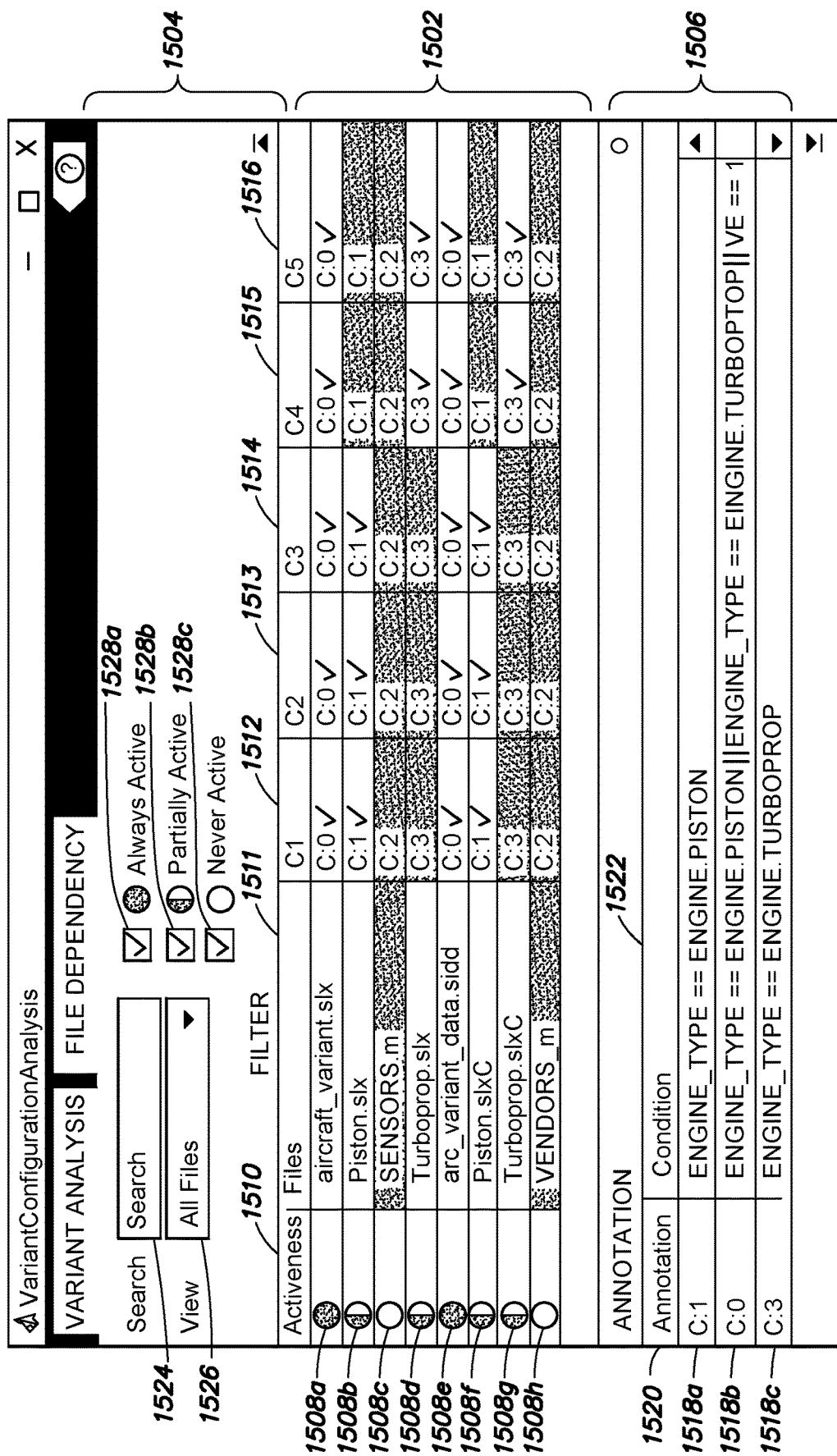
FIG. 15 is an illustration of an example report in accordance with one or more embodiments.

FIG. 15 is an illustration of an example report 1500, such as a "software" bill of materials report that include necessary files, dependencies, etc., that may be generated by the variant configuration analysis system 400 for the model 1400 in accordance with one or more embodiments. The report 1500 may include a region 1502 that presents the results of the bill of materials analysis, another region 1504 for filtering the information presented in the region 1502, and a further region 1506 that maps variant conditions to the annotations, abbreviations, or symbols used in the region 1502.

The region 1502 may present the results of the bill of materials analysis of the model 1400 in the form of a heat map having rows and columns that define cells presenting information. For example, the heat map may include a plurality of rows 1508a-h where each row corresponds to an electronic file for the model 1400 and a plurality of columns 1510-1516 for indicating which variant configuration requires a respective file. In some embodiments, the heat map also may present variant configuration analysis results for the files. The column 1510 labeled 'Activeness' may present a graphical affordance indicating whether the respective file is never active, always active, or partially active for the analyzed variant configurations. The column 1511 labeled 'Files' may identify the files, e.g., by name. The columns 1512-1516 labeled 'C1' to 'C5' represent the variant configurations for which the model 1400 was analyzed and include the results of the configuration analysis.

In some embodiments, graphical affordances may be presented in the cells defined by the rows 1508 and the columns 1512-1516 to indicate whether a file is included in a version of the model 1400 implementing the respective variant configuration. For example, a checkmark may be used to indicate that the file is included in the version of the model 1400 implementing the variant configuration. Rows 1508f and 1508g, for example, illustrate that the 'Piston.slxc' file is included in the versions of the model 1400 implementing variant configurations C1, C2, and C3, while the 'Turboprop.slxc' file is included in the versions of the model 1400 implementing variant configurations C4 and C5.

In addition, the UI engine 202 may apply graphical affordances, such as different colors or grayscale shading, in the columns 1511-1516 in the form of a heatmap to indicate whether a file element is always active, never active, or partially active for the analyzed variant configurations. A row that is entirely shaded, such as rows 1508c and 1508h, indicates that the files, e.g., the 'SENSORS.m' and 'VENDORS.m' files, are not included in any of the versions of the model 1400 for the analyzed variant configurations. A row with no shading, such as rows 1508a and 1508e, indicates that the file, e.g., the 'aircraft_variants.slx' and 'arc_variant_data.sldd' files, is included in all versions of the model 1400 for the analyzed variant configurations. A row with some shading, such as row 1508b, indicates that the file, e.g., the 'Piston.slx' file, is included in some but not all of the versions of the model 1400 for the analyzed variant configurations.

In addition to the graphical affordances, information identifying the variant conditions propagated to model elements that are implemented by the files may be presented in the columns 1512-1516. Because the variant conditions propagated to model elements can become complex, annotations may be presented in the columns 1512-1516 instead of the variant conditions themselves. As previously described, these annotations may take the form c:#. Other forms of the annotations may also be used such as an expression of groups, e.g. "c:3 && c:2" where c:3 is equivalent to an expression, and c:2 is another expression.

The region 1506 may identify the variant conditions associated with the annotations used in the region 1502. The region 1506 may present information in the form of a table having rows and columns that define cells presenting information. For example, the table may include a plurality of rows, only some of which, e.g., rows 1518a-c, are shown, where each row 1518 corresponds to a particular annotation. The table presented in the region 1506 also may include a plurality of columns, such as columns 1520 and 1522. The column 1520 labeled 'Annotation' may identify the annotations and the column 1522 labeled 'Condition' may present the variant conditions represented by the respective annotations.

The region 1504 may include user interface elements for filtering the information presented in the region 1502. In some embodiments, the region 1504 may include a search field 1524, a drop down menu 1526, and checkboxes 1528a-c. In response to a user entering a file name in the search field 1524, only rows 1508 for files matching that name, if any, may be presented in the region 1502. As described, the search field 1524 may support regular expression matching. The drop down menu 1526 may present options for filtering which files for a model are included in the region 1502. The options may include all files as shown or only files of a particular type, such as .slx files, .m files, etc. The checkboxes 1528a-c may be selected/deselected to present files determined to be always active, partially, e.g., sometimes, active, or never active, respectively, for the analyzed variant configurations.

For purposes of explanation, portions of the present disclosure refer to model elements, such as blocks, of the Simulink® simulation environment. This is not intended as limiting and it should be understood that the present disclosure may be used with other simulation environments supporting other model elements.

Figure 16:
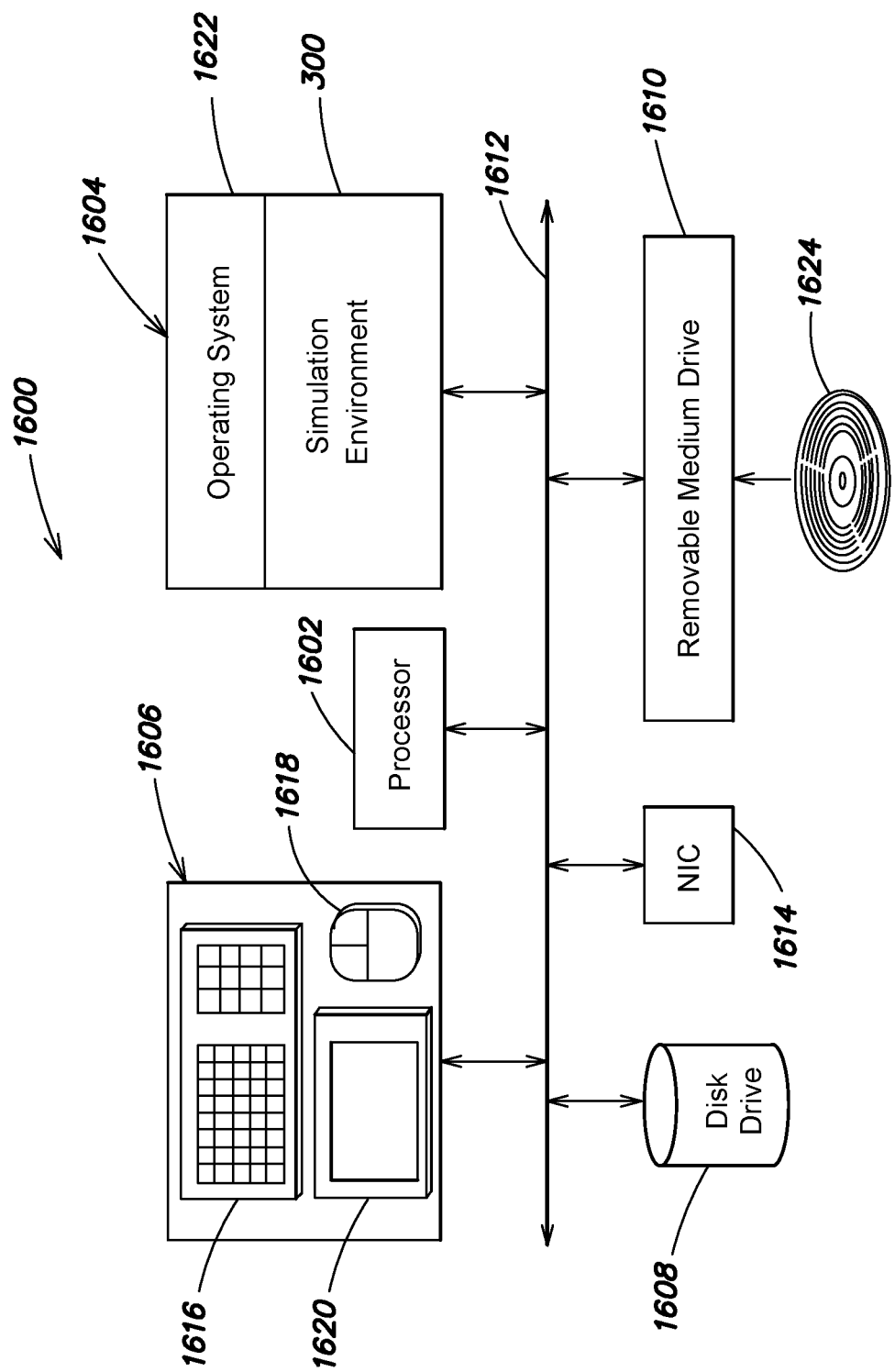
FIG. 16 is a schematic illustration of an example data processing system for implementing one or more embodiments of the present disclosure in accordance with one or more embodiments.

FIG. 16 is a schematic illustration of an example computer or data processing system 1600 for implementing one or more embodiments of the present disclosure. The computer system 1600 may include one or more processing elements, such as a processor 1602, a main memory 1604, user input/output (I/O) 1606, a persistent data storage unit, such as a disk drive 1608, and a removable medium drive 1610 that are interconnected by a system bus 1612. The computer system 1600 may also include a communication unit, such as a network interface card (NIC) 1614. The user I/O 1606 may include a keyboard 1616, a pointing device, such as a mouse 1618, and a display 1620. Other user I/O 1606 components include voice or speech command systems, touchpads and touchscreens, printers, projectors, etc. Exemplary processors include single or multi-core Central Processing Units (CPUs), Graphics Processing Units (GPUs), Field Programmable Gate Arrays (FPGAs), Application Specific Integrated Circuits (ASICs), microprocessors, microcontrollers, etc.

The main memory 1604, which may be a Random Access Memory (RAM), may store a plurality of program libraries or modules, such as an operating system 1622, and one or more application programs that interface to the operating system 1622, such as the simulation environment 300.

The removable medium drive 1610 may accept and read a computer readable medium 1624, such as a CD, DVD, floppy disk, solid state drive, tape, flash memory or other non-transitory medium. The removable medium drive 1610 may also write to the computer readable medium 1624.

Suitable computer systems include personal computers (PCs), workstations, servers, laptops, tablets, palm computers, smart phones, electronic readers, and other portable computing devices, etc. Nonetheless, those skilled in the art will understand that the computer system 1600 of FIG. 16 is intended for illustrative purposes only, and that the present disclosure may be used with other computer, data processing, or computational systems or devices. The present disclosure may also be used in a computer network, e.g., client-server, architecture, or a public and/or private cloud computing arrangement. For example, the simulation environment 300 may be hosted on one or more cloud servers or devices, and accessed by remote clients through a web portal or an application hosting system, such as the Remote Desktop Connection tool from Microsoft Corp.

Suitable operating systems 1622 include the Windows series of operating systems from Microsoft Corp. of Redmond, WA, the Android and Chrome OS operating systems from Google Inc. of Mountain View, CA, the Linux operating system, the MAC OS® series of operating systems from Apple Inc. of Cupertino, CA, and the UNIX® series of operating systems, among others. The operating system 1622 may provide services or functions for applications or modules, such as allocating memory, organizing data objects or files according to a file system, prioritizing requests, managing I/O, etc. The operating system 1622 may run on a virtual machine, which may be provided by the data processing system 1600.

As indicated above, a user, such as an engineer, scientist, programmer, developer, etc., may utilize one or more input devices, such as the keyboard 1616, the mouse 1618, and the display 1620 to operate the modeling environment 300, and construct and revise one or more models. As discussed, the models may be computational and may have executable semantics. In particular, the models may be simulated or run. In particular, the models may provide one or more of time-based, event-based, state-based, message-based, frequency-based, control-flow based, and dataflow-based execution semantics. The execution of a model may simulate operation of the system that is being designed or evaluated. The modeling environment 300 may implement a visual programming language, and a model may be a program conforming to that visual programming language.

Exemplary simulation environments include the MATLAB® algorithm development environment and the Simulink® model-based design environment from The Math Works, Inc., as well as the Simscape™ physical modeling system and the Stateflow® state chart tool also from The MathWorks, Inc., the MapleSim physical modeling and simulation tool from Waterloo Maple Inc. of Waterloo, Ontario, Canada, the LabVIEW virtual instrument programming system and the NI MatrixX model-based design product both from National Instruments Corp. of Austin, TX, the Visual Engineering Environment (VEE) from Keysight Technologies, Inc. of Santa Clara, CA, the System Studio model-based signal processing algorithm design and analysis tool, the Dymola modeling and simulation environment from Dassualt Systemes SE of Vélizy-Villacoublay, France, the SCADE Suite model-based development environment from Ansys Inc. of Canonsburg, PA, and the SPW signal processing algorithm tool from Synopsys, Inc. of Mountain View, CA, a Unified Modeling Language (UML) system, a Systems Modeling Language (SysML) system, the System Generator system from Xilinx, Inc. of San Jose, CA, and the Rational Rhapsody Design Manager software from IBM Corp. of Somers, NY. Models created in the high-level simulation environment may contain less implementation detail, and thus operate at a higher level than certain programming languages, such as the C, C++, C#, and SystemC programming languages.

Those skilled in the art will understand that the MATLAB® algorithm development environment is a math-oriented, textual programming environment for digital signal processing (DSP) design, among other uses. The Simulink® model-based design environment is a modeling tool for modeling and simulating dynamic and other systems, among other uses. The MATLAB® and Simulink® environments provide a number of high-level features that facilitate algorithm development and exploration, and support model-based design. Exemplary high-level features include dynamic typing, array-based operations, data type inferencing, sample time inferencing, and execution order inferencing, among others.

In some embodiments, a lower level programming language relative to the high-level simulation environment 300, such as the C, C++, C#, and SystemC programming languages, among others, may be used to create one or more models.

Models constructed within the simulation environment 300 may include textual models, graphical models, such as block diagrams, state-based models, and combinations thereof. A given model may simulate, e.g., approximate the operation of, a system.

Exemplary code generators include, but are not limited to, the Simulink® Coder™, the Embedded Coder®, and the HDL Coder™ products from The Math Works, Inc. of Natick, MA, the TargetLink product from dSpace GmbH of Paderborn Germany, and the QGen code generator from AdaCore of Paris, France.

Figure 17:
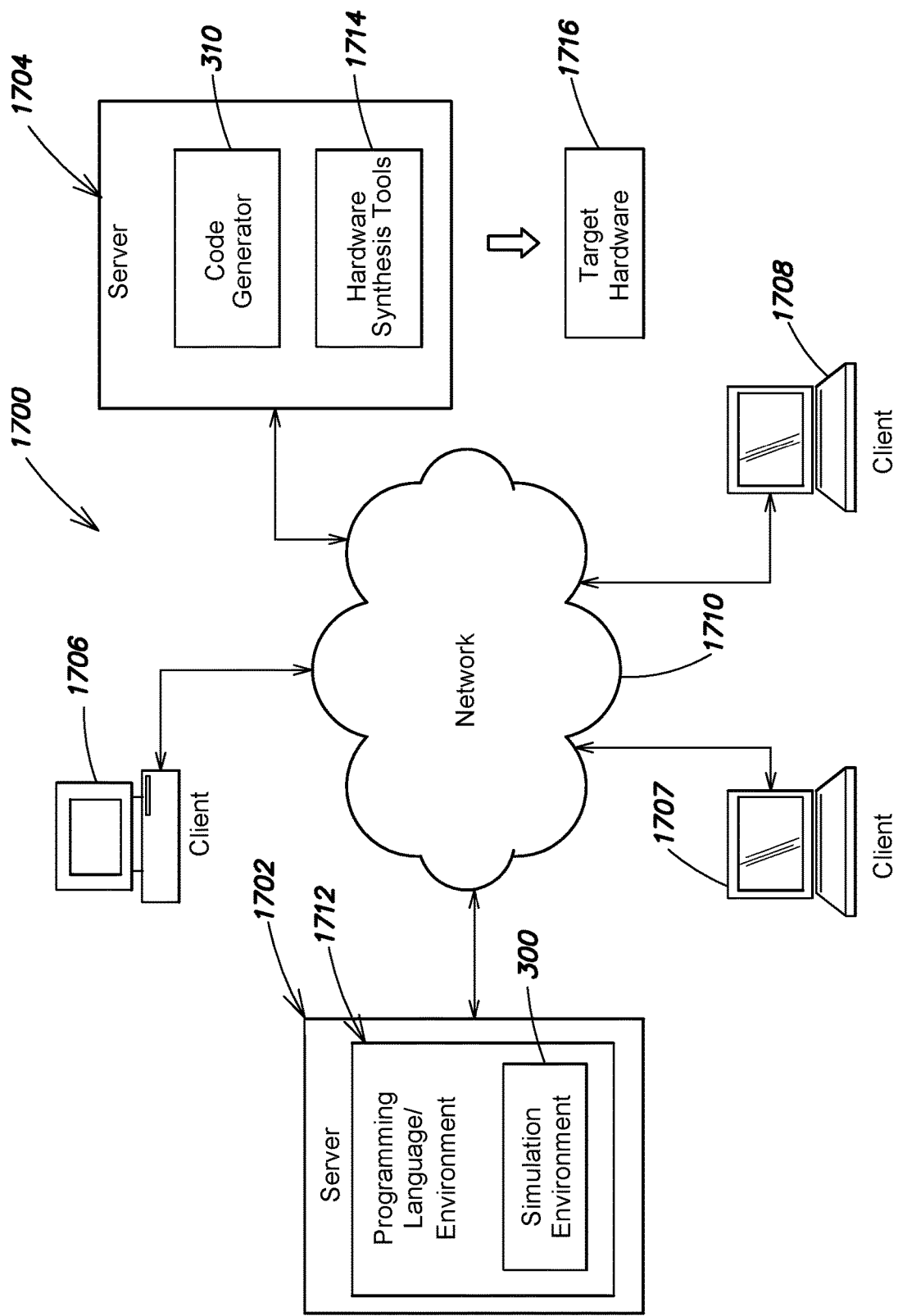
FIG. 17 is a schematic diagram of an example distributed computing environment in which systems and/or methods of the present disclosure may be implemented in accordance with one or more embodiments.

FIG. 17 is a schematic diagram of an example distributed computing environment 1700 in which systems and/or methods of the present disclosure may be implemented in accordance with one or more embodiments. The environment 1700 may include client and server devices, such as two servers 1702 and 1704, and three clients 1706-1708, interconnected by one or more networks, such as network 1710. The devices of the environment 1700 may interconnect via wired connections, wireless connections, or a combination of wired and wireless connections. The servers 1702 and 1704 may include one or more devices capable of receiving, generating, storing, processing, executing, and/or providing information. For example, the servers 1702 and 1704 may include a computing device, such as a server, a desktop computer, a laptop computer, a tablet computer, a handheld computer, or a similar device.

The clients 1706-1708 may be capable of receiving, generating, storing, processing, executing, and/or providing information. Information may include any type of machine-readable information having substantially any format that may be adapted for use, e.g., in one or more networks and/or with one or more devices. The information may include digital information and/or analog information. The information may further be packetized and/or non-packetized. In an embodiment, the clients 1706-1708 may download data and/or code from the servers 1702 and 1704 via the network 1710. In some implementations, the clients 1706-1708 may be desktop computers, workstations, laptop computers, tablet computers, handheld computers, mobile phones (e.g., smart phones, radiotelephones, etc.), electronic readers, or similar devices. In some implementations, the clients 1706-1708 may receive information from and/or transmit information to the servers 1702 and 1704.

The network 1710 may include one or more wired and/or wireless networks. For example, the network 1710 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks. Information may be exchanged between network devices using any network protocol, such as, but not limited to, the Internet Protocol (IP), Asynchronous Transfer Mode (ATM), Synchronous Optical Network (SONET), the User Datagram Protocol (UDP), Institute of Electrical and Electronics Engineers (IEEE) 802.11, etc.

The servers 1702 and 1704 may host applications or processes accessible by the clients 1706-1708. For example, the server 1702 may include a programming language/environment 1712, which may include or have access to the simulation environment 300. The server 1704 may include a code generator, such as the code generator 310, and a hardware synthesis tool 1714. The code generator 232 may generate code for a simulation model, such as HDL code, which may be provided to the hardware synthesis tool 1714. The hardware synthesis tool 1714 may translate the generated code into a bitstream or other format, and may synthesize, e.g., configure, a target system 1716, which may be a real-world system. In this way, the functionality defined by the simulation model may be deployed to a real-world system. For example, the hardware synthesis tool 1714 may configure a programmable logic device, such as a Field Programmable Gate Array (FPGA) or other Programmable Logic Device (PLD), of the target system 1716.

The number of devices and/or networks shown in FIG. 17 is provided as an example. In practice, there may be additional devices and/or networks, fewer devices and/or networks, different devices and/or networks, or differently arranged devices and/or networks than those shown in FIG. 17. Furthermore, two or more devices shown in FIG. 17 may be implemented within a single device, or a single device shown in FIG. 17 may be implemented as multiple, distributed devices. Additionally, one or more of the devices of the distributed computing environment 1700 may perform one or more functions described as being performed by another one or more devices of the environment 1700.

The foregoing description of embodiments is intended to provide illustration and description, but is not intended to be exhaustive or to limit the disclosure to the precise form disclosed. Modifications and variations are possible in light of the above teachings or may be acquired from a practice of the disclosure. For example, while a series of acts has been described above with respect to the flow diagrams, the order of the acts may be modified in other implementations. In addition, the acts, operations, and steps may be performed by additional or other modules or entities, which may be combined or separated to form other modules or entities. Further, non-dependent acts may be performed in parallel. Also, the term "user", as used herein, is intended to be broadly interpreted to include, for example, a computer or data processing system or a human user of a computer or data processing system, unless otherwise stated.

Further, certain embodiments of the disclosure may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as system 1600. The computer-executable instructions may include instructions that implement one or more embodiments of the disclosure. The tangible non-transitory computer-readable storage media may be volatile or non-volatile and may include, for example, flash memories, dynamic memories, removable disks, and non-removable disks.

No element, act, or instruction used herein should be construed as critical or essential to the disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present disclosure. It will be apparent, however, that other variations and modifications may be made to the described embodiments, with the attainment of some or all of their advantages. Therefore, it is the object of the appended claims to cover all such variations and modifications as come within the true spirit and scope of the disclosure.

What is claimed is:

1. A computer-implemented method comprising:
for an executable simulation model with variants that include computational choices that define alternative execution implementations of the executable simulation model, wherein variant conditions associated with the computational choices indicate which one of the computational choices included in the variants is active for a given execution of the executable simulation model or a given code generation process for the executable simulation model, organizing, by one or more processors, sets of values associated with the variant conditions for the computational choices included in the variants into variant configurations that activate different combinations of the computational choices included in the variants, wherein the variant configurations form a group;
propagating, by the one or more processors, the variant conditions to a plurality of model elements of the executable simulation model;
for each model element of the plurality of model elements, determining, by the one or more processors, whether the model element is active or is inactive for each variant configuration from the group of variant configurations;
storing in one or more data structures status information identifying:
 a first set of model elements from the plurality of model elements wherein the first set of model elements is determined to be active for all of the variant configurations in the group;
 a second set of model elements from the plurality of model elements wherein the second set of model elements is determined to be active for at least one but not all of the variant configurations in the group; and
 a third set of model elements from the plurality of model elements wherein the third set of model elements is determined to be inactive for all of the variant configurations in the group; and
outputting, by the one or more processors, information identifying at least one model element from each of the first set of model elements, the second set of model elements, and the third set of model elements.

2. The computer-implemented method of claim 1 wherein the variant conditions specify logical expressions of variables, the values are assigned to the variables, and the determining includes evaluating the variant conditions of the sets organized into the group of variant configurations based on the values assigned to one or more of the variables.

3. The computer-implemented method of claim 1 wherein the outputting includes generating at least one of a heat map, a graph, a version of the executable simulation model, or a report and either presenting the at least one of the heat map, the graph, the version of the executable simulation model, or the report on a display or printing the at least one of the heat map, the graph, the version of the executable simulation model, or the report.

4. The computer-implemented method of claim 1 wherein the plurality of model elements include at least one of blocks, parameters, states, state transitions, messages, events, or signals.

5. The computer-implemented method of claim 1 wherein the propagating is performed based on one or more propagation rules for the variant conditions.

6. The computer-implemented method of claim 1 further comprising:
receiving the variant configurations in the group.

7. The computer-implemented method of claim 1 further comprising:
designating the first set of model elements as being always active,
designating the second set of model elements as being always inactive, and
designating the third set of model elements as being partially active.

8. The computer-implemented method of claim 1 wherein the variants of the executable simulation model operate according to a physical domain.

9. The computer-implemented method of claim 8 wherein the physical domain is one or more of a mechanical domain, an electrical domain, or a hydraulic domain.

10. A computer-implemented method comprising:
for an executable simulation model with variants that include computational choices that define alternative execution implementations of the executable simulation model, wherein variant conditions associated with the computational choices indicate which one of the computational choices included in the variants is active for a given execution of the executable simulation model or a given code generation process for the executable simulation model, organizing, by one or more processors, sets of values associated with the variant conditions for the computational choices included in the variants into variant configurations that activate different combinations of the computational choices included in the variants, wherein the variant configurations for a group;
propagating, by the one or more processors, the variant conditions to a plurality of model elements of the executable simulation model, wherein a plurality of requirements are specified for the executable simulation model and each of the plurality of requirements is associated with one or more of the plurality of model elements;
for each model elements from the plurality of model elements, determining, by the one or more processors, whether the model element is active or is inactive for each variant configuration from the group of variant configurations;
storing in one or more data structures status information identifying:
at least one requirement from the plurality of requirements for which a first set of model elements from the plurality of model elements is determined to be active for all of the variant configurations in the group;
at least one requirement from the plurality of requirements for which a second set of model elements from the plurality of model elements is determined to be active for at least one but not all of the variant configurations in the group; and
at least one requirement from the plurality of requirements for which a third set of model elements from the plurality of model elements is determined to be inactive for all of the variant configurations in the group; and
outputting information identifying at least one model element from each of the first set of model elements, the second set of model elements, and the third set of model elements.

11. The computer-implemented method of claim 10 wherein the outputting includes generating at least one of a heat map, a graph, or a report and either presenting the at least one of the heat map, the graph, or the report on a display or printing the at least one of the heat map, the graph, or the report.

12. The computer-implemented method of claim 10 further comprising:
designating the at least one requirement for the first set of model elements as being always active,
designating the at least one requirement for the second set of model elements as being always inactive, and
designating the at least one requirement for the third set of model elements as being partially active.

13. One more non-transitory computer-readable media, having stored thereon instructions that when executed by a computing device, cause the computing device to perform operations comprising:
for an executable simulation model providing variants that include computational choices that define alternative execution implementations of the executable simulation model, wherein variant conditions associated with the computational choices indicate which one of the computational choices included in the variants is active for a given execution of the executable simulation model or a given code generation process for the executable simulation model, organize sets of values associated with the variant conditions for the computational choices included in the variants into variant configurations that activate different combinations of the computational choices included in the variants, wherein the variant configurations form a group;
propagate the variant conditions to a plurality of model elements of the executable simulation model;
for each model element of the plurality of model elements, determine whether the model element is active or is inactive for each variant configuration from the group of variant configurations;
store in one or more data structures status information identifying:
a first set of model elements from the plurality of model elements wherein the first set of model elements is determined to be active for all of the variant configurations in the group;
a second set of model elements from the plurality of model elements wherein the third set of model elements is determined to be active for at least one but not all of the variant configurations in the group;
identifying a third set of model elements from the plurality of model elements wherein the third set of model elements is determined to be inactive for all of the variant configurations in the group; and
output information identifying at least one model element from each of the first set of model elements, the second set of model elements, and the third set of model elements.

14. The one or more non-transitory computer-readable media of claim 13 wherein the variant conditions specify logical expressions of variables, the values are assigned to the variables, and the identify includes evaluate the variant conditions of the sets organized into the group of variant configurations based on the values assigned to one or more of the variables.

15. The one or more non-transitory computer-readable media of claim 13 wherein the output includes generate at least one of a heat map, a graph, or a report and either presenting the at least one of the heat map, the graph, or the report on a display or printing the at least one of the heat map, the graph, or the report.

16. The one or more non-transitory computer-readable media of claim 13 wherein the propagate is performed based on one or more propagation rules for the variant conditions.

17. The one or more non-transitory computer-readable media of claim 13 wherein the operations further comprise:
designate the first set of model elements as being always active,
designate the second set of model elements as being always inactive, and
designate the third set of model elements as being partially active.

18. An apparatus comprising:
one or more memories storing an executable simulation model with variants that include computational choices that define alternative execution implementations of the executable simulation model, wherein variant conditions associated with the computational choices indicate which one of the computational choices included in the variants is active for a given execution of the executable simulation model or a given code generation process for the executable simulation model; and
one or more processors coupled to the one or more memories, wherein the one or more processors are configured to:
organize sets of values associated with the variant conditions for the computational choices included in the variants into variant configurations that active different combinations of the computational choices included in the variants, wherein the variant configurations form a group;
propagate the variant conditions to a plurality of model elements of the executable simulation model;
determine, for each model element of the model elements, whether the model element is active or is inactive for each variant configuration from the group of variant configurations;
store in one or more data structures status information identifying:
a first set of model elements from the plurality of model elements wherein the first set of model elements is determined to be active for all of the variant configurations in the group;
a second set of model elements from the plurality of model elements wherein the second set of model elements is determined to be active for at least one but not all of the variant configurations in the group; and
a third set of model elements from the plurality of model elements wherein the third set of model elements is determined to be inactive for all of the variant configurations in the group; and
output information identifying at least one model element from each of the first set of model elements, the second set of model elements, and the third set of model elements.

19. The apparatus of claim 18 wherein the variant conditions specify logical expressions of variables, the values are assigned to the variables, and the determine includes evaluate the variant conditions of the sets organized into the group of variant configurations based on the values assigned to one or more of the variables.

20. The apparatus of claim 18 wherein the output includes generate at least one of a heat map, a graph, or a report and either presenting the at least one of the heat map, the graph, or the report on a display or printing the at least one of the heat map, the graph, or the report.

21. The apparatus of claim 18 wherein the propagate is performed based on one or more propagation rules for the variant conditions.

22. The apparatus of claim 18 wherein the one or more processors is further configured to
designate the first set of model elements as being always active,
designate the second set of model elements as being always inactive, and
designate the third set of model elements as being partially active.

23. One more non-transitory computer-readable media, having stored thereon instructions that when executed by a computing device, cause the computing device to perform operations comprising:
for an executable simulation model with variants that include computational choices that define alternative execution implementations of the executable simulation model, wherein variant conditions associated with the computational choices indicate which one of the computational choices included in the variants is active for a given execution of the executable simulation model or a given code generation process for the executable simulation model, organizing sets of values associated with the variant conditions for the computational choices included in the variants into variant configurations that activate different combinations of the computational choices included in the variants, wherein the variant configurations form a group;
propagating the variant conditions to a plurality of model elements of the executable simulation model, wherein a plurality of requirements are specified for the executable simulation model and each of the plurality of requirements is associated with one or more of the plurality of model elements;
for each of the model elements from the plurality of model elements, determining whether the model element is active or is inactive for each variant configuration from the group of variant configurations;
storing in one or more data structures status information identifying:
at least one requirement from the plurality of requirements for which a first set of model elements from the plurality of model elements is determined to be active for all of the variant configurations in the group;
at least one requirement from the plurality of requirements for which a second set of model elements from the plurality of model elements is determined to be active for at least one but not all of the variant configurations in the group; and
at least one requirement from the plurality of requirements for which a third set of model elements from the plurality of model elements is determined to be inactive for all of the variant configurations in the group; and
outputting information identifying at least one model element from each of the first set of model elements, the second set of model elements, and the third set of model elements.

24. The computer-readable media of claim 23 wherein the outputting includes generating at least one of a heat map, a graph, or a report and either presenting the at least one of the heat map, the graph, or the report on a display or printing the at least one of the heat map, the graph, or the report.

25. An apparatus comprising:
one or more memories storing an executable simulation model with variants that include computational choices that define alternative execution implementations of the executable simulation model, wherein variant conditions associated with the computational choices indicate which one of the computational choices included in the variants is active for a given execution of the executable simulation model or a given code generation process for the executable simulation model; and
one or more processors coupled to the one or more memories, wherein the one or more processors are configured to:
organize sets of values associated with the variant conditions for the computational choices included in the variants into variant configurations that activate different combinations of the computational choices included in the variants, wherein the variant configurations form a group;
propagate the variant conditions to a plurality of model elements of the executable simulation model, wherein a plurality of requirements are specified for the executable simulation model and each of the plurality of requirements is associated with one or more of the plurality of model elements;
for each model elements from the plurality of model elements, determine whether the model element is active or is inactive for each variant configuration from the group of variant configurations;
store in one or more data structures status information identifying:
at least one requirement from the plurality of requirements for which a first set of model elements from the plurality of model elements is determined to be active for all of the variant configurations in the group;
at least one requirement from the plurality of requirements for which a second set of model elements from the plurality of model elements is determined to be active for at least one but not all of the variant configurations in the group; and
at least one requirement from the plurality of requirements for which a third set of model elements from the plurality of model elements is determined to be inactive for all of the variant configurations in the group; and
output information identifying at least one model element from each of the first set of model elements, the second set of model elements, and the third set of model elements.

26. The apparatus of claim 25 wherein the outputting includes generating at least one of a heat map, a graph, or a report and either presenting the at least one of the heat map, the graph, or the report on a display or printing the at least one of the heat map, the graph, or the report.

* * * * *